United States Patent
Kirti et al.

(10) Patent No.: US 10,701,094 B2
(45) Date of Patent: Jun. 30, 2020

(54) TECHNIQUES FOR MONITORING PRIVILEGED USERS AND DETECTING ANOMALOUS ACTIVITIES IN A COMPUTING ENVIRONMENT

(71) Applicant: Oracle International Corporation, Redwood Shores, CA (US)

(72) Inventors: Ganesh Kirti, San Jose, CA (US); Kamalendu Biswas, San Ramon, CA (US); Merenne Sumedha Nalin Perera, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 186 days.

(21) Appl. No.: 16/011,538

(22) Filed: Jun. 18, 2018

(65) Prior Publication Data

US 2018/0375886 A1    Dec. 27, 2018

Related U.S. Application Data

(60) Provisional application No. 62/523,668, filed on Jun. 22, 2017.

(51) Int. Cl.
*H04L 29/06* (2006.01)
*H04L 12/26* (2006.01)
(Continued)

(52) U.S. Cl.
CPC .......... *H04L 63/1425* (2013.01); *H04L 41/28* (2013.01); *H04L 43/04* (2013.01);
(Continued)

(58) Field of Classification Search
None
See application file for complete search history.

(56) References Cited

U.S. PATENT DOCUMENTS 9,674,211 B2    6/2017    Curcic et al.
9,692,789 B2    6/2017    Kirti et al.
(Continued)

FOREIGN PATENT DOCUMENTS

CN    106341386         9/2018
WO    2016177437 A1    11/2016
WO    2018236915       12/2018

OTHER PUBLICATIONS

"A Cybersecurity Checklist for Monitoring SaaS Applications", Arctic Wolf, Available Online at: https://arcticwolf.com/resources/cybersecurity-checklist-for-monitoring-saas-applications/, 2018, 2 pages.
(Continued)

*Primary Examiner* — William J. Goodchild
(74) *Attorney, Agent, or Firm* — Kilpatrick Townsend & Stockton LLP

(57) ABSTRACT

In various implementations, a security management and control system for monitoring and management of security for cloud services can include automated techniques for identifying the privileged users of a given cloud service. In various examples, the security management and control system can obtain activity logs from the cloud service, where the activity logs record actions performed by users of an organization in using the cloud service. In various examples, the security management and control system can identify actions in the activity logs that are privileged with respect to the cloud service. In these and other examples, the security management and control system can use the actions in the activity log to identify privileged users. Once the privileged users are identified, the security management and control system can monitor the privileged users with a higher degree of scrutiny.

20 Claims, 9 Drawing Sheets

(51) Int. Cl.
H04L 12/24 (2006.01)
H04L 29/08 (2006.01)
(52) U.S. Cl.
CPC .......... *H04L 63/102* (2013.01); *H04L 63/104* (2013.01); *H04L 63/1416* (2013.01); *H04L 63/1433* (2013.01); *H04L 63/1441* (2013.01); *H04L 63/20* (2013.01); *H04L 67/10* (2013.01)

(56) References Cited

U.S. PATENT DOCUMENTS

| | | | |
|---|---|---|---|
| 9,852,208 | B2 | 12/2017 | Chari et al. |
| 9,876,804 | B2 | 1/2018 | Dulkin et al. |
| 10,142,362 | B2 | 11/2018 | Weith et al. |
| 2014/0165167 | A1* | 6/2014 | Nunn ...................... G06F 21/45 726/6 |
| 2015/0319185 | A1 | 11/2015 | Kirti et al. |
| 2017/0251013 | A1 | 8/2017 | Kirti et al. |
| 2017/0295199 | A1 | 10/2017 | Kirti et al. |
| 2018/0027006 | A1 | 1/2018 | Zimmermann et al. |

OTHER PUBLICATIONS

"Artificial Neural Network", Wikipedia, Available online at: https://en.wikipedia.org/wiki/Artificial_neural_network, retrieved on May 29, 2017, 22 pages.
"Decision Tree Learning", Wikipedia, Available online at: https://en.wikipedia.org/wiki/Decision_tree_learning, retrieved on May 29, 2017, 9 pages.
"Instantly Start Monitoring the Cybersecurity Health of Any Organization", Security Scorecard, Available online at: https://securityscorecard.com/, retrieved on May 29, 2017, 15 pages.
"Linear Regression", Wikipedia, Available online at: https://en.wikipedia.org/wiki/Linear_regression, retrieved on May 99, 2017, 1 page.
"MCL—A Cluster Algorithm for Graphs", Available online at: https://micans.org/mcl/, retrieved on Jun. 5, 2017, 1 page.
"Privileged Accounts", Securonix Security Analytics Platform, Securonix, Available Online at: https://www.securonix.com/solutions/privileged-accounts/, Jan. 7, 2019, 2 pages.
Introducing: Ransomware Tracker, abise/cj—The Swiss Security Blog, Available online at: http://www.abuse.ch/, retrieved on May 29, 2017, 7 pages.
"The New Standard in Business Data", Clearbit, Available online at: https://clearbit.com/, retrieved on May 29, 2017, 7 pages.
Wikipedia—The Free Encyclopedia, Available online at: https://www.wikipedia.org/, retrieved on May 29, 2017, 2 pages.
Girvan et al., "Girvan-Newman Algorithm", Wikipedia, Available online at: https://en.wikipedia.org/wiki/Girvan%E2%80%93Newman_algorithm, retrieved on May 19, 2017, 2 pages.
Gupta et al., "Identification of Effective Public Cloud on User Query", International Journal of Computer Trends and Technology, vol. 4, Issue 7, Jul. 2013, 5 pages.
U.S. Appl. No. 14/523,804, Non-Final Office Action dated Sep. 27, 2016, 37 pages.
U.S. Appl. No. 14/523,804, Notice of Allowance dated Apr. 5, 2017, 11 pages.
U.S. Appl. No. 14/523,804, Supplemental Notice of Allowability dated May 31, 2017, 2 pages.
U.S. Appl. No. 14/749,522, Final Office Action dated Sep. 25, 2017, 27 pages.
U.S. Appl. No. 14/749,522, Non-Final Office Action dated Jan. 12, 2017, 20 pages.
U.S. Appl. No. 14/749,522, Notice of Allowance dated Apr. 12, 2018, 13 pages.
U.S. Appl. No. 15/632,174, Non-Final Office Action dated Feb. 22, 2018, 37 pages.
European Patent Application No. 14868736.1, Extended European Search Report dated May 15, 2017, 5 pages.
International Application No. PCT/US2014/065523, International Preliminary Report on Patentability dated Jun. 23, 2016, 12 pages.
International Application No. PCT/US2014/065523, International Search Report and Written Opinion dated Feb. 23, 2015, 12 pages.
International Application No. PCT/US2017/019508, International Search Report and Written Opinion dated May 2, 2017, 10 pages.
International Application No. PCT/US2018/038347, International Search Report and Written Opinion dated Sep. 6, 2018, 12 pages.
"Shell Control Box 4 LTS Product Description", BalaBit IT Security, Copyright 2000-2014, 19 pages.
Akita, Instant Privacy for Smart Homes, Kickstarter, Available online at: https://www.kickstartercom/projects/akita/akita-instant-privacy-for-smart-homes, 2018, 23 pages.
PCT/US2018/038347 received an International Preliminary Report on Patentability dated Jan. 2, 2020, 8 pages.

* cited by examiner

TECHNIQUES FOR MONITORING PRIVILEGED USERS AND DETECTING ANOMALOUS ACTIVITIES IN A COMPUTING ENVIRONMENT

CROSS REFERENCE TO RELATED APPLICATIONS

The present applications claims priority to U.S. Provisional Application No. 62/523,668, filed on Jun. 22, 2017, which is incorporated herein by reference in its entirety.

BACKGROUND

Cloud service providers provide various services in the "cloud;" that is, over a network, such as the public Internet, and remotely accessible to any network-connected client device. Examples of the service models used by cloud service providers (also referred to herein as "cloud providers" or "providers") include infrastructure as a service (IaaS), platform as a service (PaaS), software as a service (SaaS), and network as a service (NaaS). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to customer on a subscription basis, and is centrally hosted by the cloud provider. Under this model, applications can be accessed, for example, using a web browser. NaaS providers provide network services to customers, for example by provisioning a virtual network on the network infrastructure operated by another party. In each of these service models, the cloud service provider maintains and manages the hardware and/or software that provide the services, and little, if any, software executes on a user's device.

Customers of cloud service providers, which can be referred to as users or tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users. Examples of service providers include Box, Dropbox, Microsoft, Docusign, Google, Salesforce, Oracle, Amazon, and others. Service provider such as these can provide multiple different services, but different service providers need not have any affiliation with one another, including not sharing infrastructure or security boundaries. Service provider systems are often also heavily secured and closed to non-tenants.

The reliance of organizations on computing environments has led to widespread adoption of cloud services for operations such as collaboration, sales and customer services, infrastructures, and so on. Applications provided through a cloud environment may enable organizations to rollout services faster and without much upfront investment on data center, hardware, software, and deployment projects. The accessibility of applications can increase employee productivity due to the availability of cloud enabled services from many locations, such as at work, at home, at a hotel, and other locations.

Because organizations and/or users of an organization may subscribe to the services of many different cloud services providers, an organization may need ways to ensure the organization's own systems do not come to harm through the use of cloud services. Use of cloud services can lead to security risks that are not present when an organization hosts and manages services within the organization itself.

BRIEF SUMMARY

In various implementations, provided are systems and methods for a cloud security system that can identify users that have privileged capabilities with respect to an application or service provided by a cloud services provider. Users with privileged capabilities, which can be referred to as administrative users or privileged users, can have the ability to access or modify a cloud service that can change the way the cloud service operates and/or the manner in which other users use the cloud services. Because privileged users have more capabilities with respect to a cloud service than do ordinary users, it may be desirable to monitor privileged users with a higher degree of scrutiny, and to determine quickly whether a privileged user account has become compromised.

With cloud services, however, knowing which users are privileged and which are ordinary users may not be straightforward. Different cloud services can have different parameters for what makes a user privileged. Additionally, a cloud service may not provide a way for a customer to determine which user accounts are privileged.

Provided are systems, methods, and computer-readable medium that enable a security management system to identify the privileged users of a cloud service. In various implementations, the security management system can include techniques for identifying privileged users of a cloud service, where the techniques include performing various steps. The steps can include obtaining activity data from a service provider system. The activity data can describe actions performed during use of a cloud service. The actions can be performed by one or more users associated with a tenant, where the service provider system provides the tenant with a tenant account. The tenant account enables the one or more users to access the cloud service. The steps can further include identifying, in the activity data, one or more actions that are privileged with respect to the cloud service. The steps can further include identifying, using the activity data, a set of users who performed the one or more actions. The set of users can be determined from the one or more users associated with the tenant. The steps can further include categorizing the set of users as privileged. The steps can further include determining, using the activity data, one or more risk scores for the one or more users. The steps can further include determining that a risk score for user in the set of users is greater than a threshold. The steps can further include determining a security control for the service provider system, where the security control is used by the service provider system to configure access to the cloud service. The steps can further include determining one or more instructions to send to the service provider system. The steps can further include sending the one or more instructions to the service provider system. The one or more instructions can cause the security control to be changed with respect to the user, where access to the cloud service by the user is modified due to the change to the security control.

In various aspects, the one or more actions are identified using a list of actions associated with the cloud service, where actions in the list of actions are categorized as privileged with respect to the cloud service. In various aspects, the one or more actions is identified using a list of administrative actions.

In various aspects, the techniques implemented by systems, methods, and computer-readable medium described above further include steps such as using the one or more actions and past activity data to generate a model, where the model describing a pattern of usage of the cloud service that is privileged with respect to the cloud service. The steps can further include using the model to identify the set of users.

In various aspects, the techniques implemented by systems, methods, and computer-readable medium described above further include steps such as grouping the actions performed during used of the cloud service. The steps can further include identifying a group of actions that includes an action that is privileged, where the set of users is identified using the group of actions.

In various aspects, risk scores indicate a degree of security risk to the tenant from actions performed by a user in using the cloud service. In various aspects, risk scores are computed as a weight sum of risk indicators. In various examples, risk scores for users categorized as privileged are computed with greater weights than are risk scores for non-privileged users.

In various aspects, a privileged action is an action that, when executed by a first user, can modify the cloud service in a manner that affects use of the cloud service by other users. In various aspects, a privileged action is an action that, when executed by a first user, can affect user accounts of other users of the cloud service.

The foregoing, together with other features and implementations will become more apparent upon referring to the following specification, claims, and accompanying drawings.

DETAILED DESCRIPTION

Figure 1:
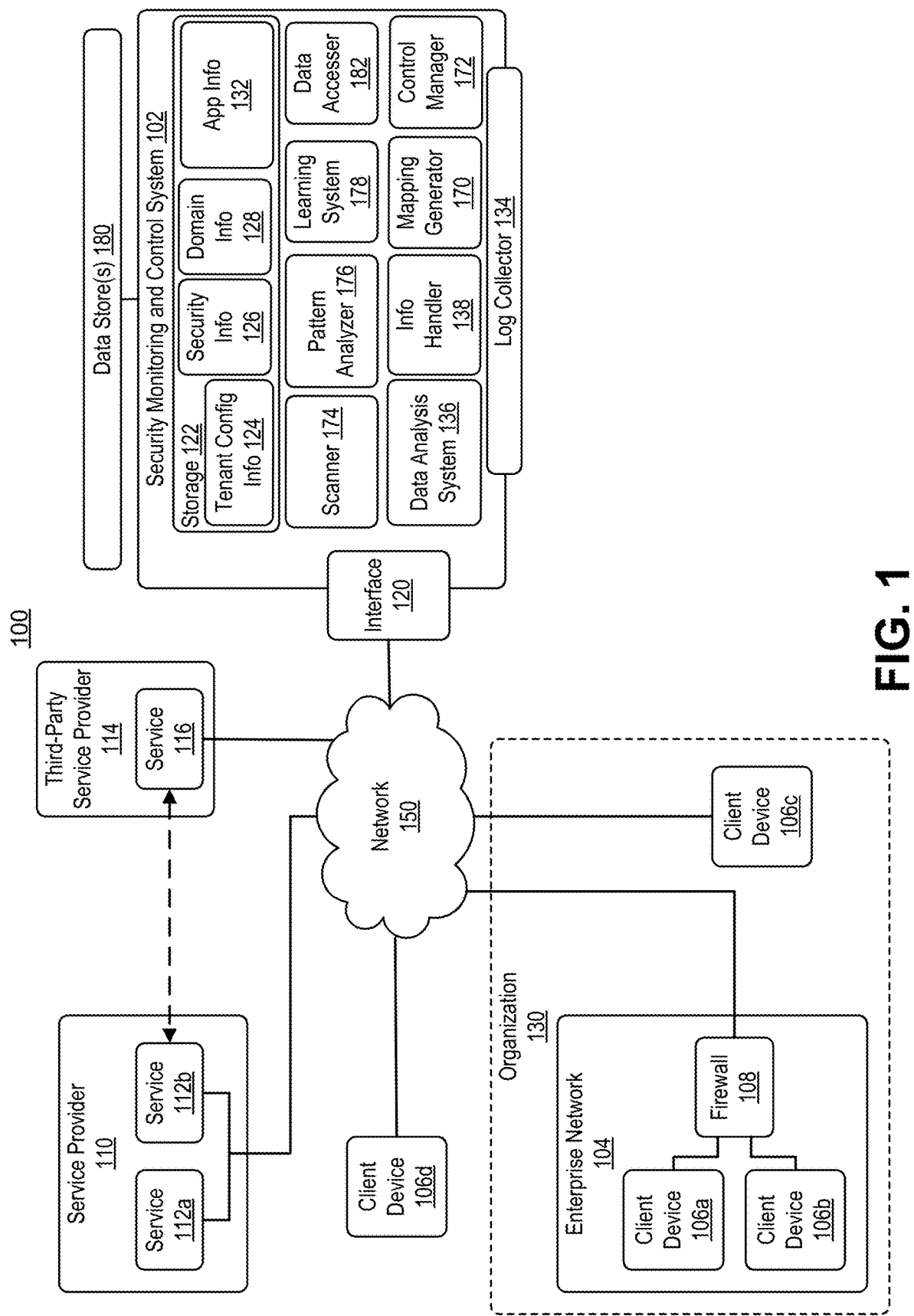
FIG. 1 includes a block diagram illustrating an example of a computing environment that includes a security monitoring and control system.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, digital signal processors (DSPs), or the like. In some examples, some or all of the processing units can be implemented using customized circuits, such as application specific integrated circuits (ASICs), or field programmable gate arrays (FPGAs).

In various examples, a cloud service can define privileges that distinguish an administrative user of the service from an ordinary user of the service. A privilege, in this context, refers to a capability to make changes to a computing resource such as a network, application, or service, among others, and/or the ability to affect a resource that is restricted from being accessed by non-privileged users. Ordinary users can have a minimal set of privileges, while administrative users have higher privileges, so that the administrative users can configure and manage the computing resource for which the administrative users have higher privileges. Administrative users are also referred to herein as privileged users.

A cloud service can subdivide and allocate privileges in various ways that may be specific to the cloud service. For example, the file sharing service Box has an access control model that defines administrative users, co-administrative users, and group administrative users. In this example, administrative users can manage users and groups, view and edit all files and folders of an organization, log in to the user account of any user in the organization, edit settings for the organization, and run or access reports. Co-administrative users can perform the same operations as administrative users, but are not able to change the permissions of administrative users. Group administrative users administrate groups within an organization, and can add users to the groups these users administrate, can create new users that will be assigned to a group, and can assign access rights to groups, but otherwise have no capabilities outside of the group.

Because administrative users have higher privileges that ordinary users, activities of administrative users may need to be given a higher degree of scrutiny than the activities of ordinary users. A higher degree of scrutiny may be needed for various reasons. For example, compliance auditors may request audit trails for administrative activities to ensure that a cloud service complies with various financial security laws. As another example, identification of rogue administrators can prevent misuse of or tampering with confidential data of an organization. As another example, administrative user accounts are frequently targeted by network attackers, who seek to gain the higher privileges that are available with administrative user accounts.

Identifying privileged users of a particular service, however, may not be straightforward. With enterprise applications, which execute within the enterprise network, an organization can sometimes integrate the applications with the organization's internal corporate identity management system. Doing so can enable the organization to manage users of the enterprise applications and the privileges assigned to the users. For cloud services, however, management of users and the users' privileges is handled within the cloud service, external to the enterprise network. Additionally, each cloud service may use a different model for granting privileges to users of the cloud service, such that the privileges that make a user an administrative user can be different for each cloud service. There may thus be no uniform definition for identifying privileges users of cloud services.

Moreover, an organization's users may use unmanaged devices (e.g., personally owned devices, as opposed to devices owned by the organization) to use a cloud service, and/or may access the cloud service from an unmanaged network (e.g., an Internet connection at home, an airport, a hotel, or otherwise outside the enterprise network). In these situations, the users' user of the cloud services may cause a security breach into an organization's network, leaving the organization vulnerable to network attacks.

Products from various vendors, such as Imperva, Lgrhythem, Cyberark, and Oracle can perform monitoring of privileged users. These products, however, require that the privileged users be identified in advance and entered in to the product for monitoring. The privileged users of a cloud service may not be known in advance, as tracking of that information may not have been meticulous. Additionally, administrative users can also change over time, with new administrative users being created by users of an organization, by automated tools, through API's, and/or by malicious users. What can occur frequently as well is that a person who created and used an administrative account may cease employment with an organization, such that knowledge of which accounts were administrative accounts can be lost over time.

In various implementations, a security management and control system for monitoring and management of security for cloud services can include automated techniques for identifying the privileged users of a given cloud service. In various examples, the security management and control system can obtain log files from the cloud service, referred to herein as activity logs, where the activity logs record actions performed by users of an organization in using the cloud service. In various examples, the security management and control system can identify actions in the activity logs that are privileged with respect to the cloud service. For example, the security management and control system can use supervised learning techniques and unsupervised learning techniques to develop a model that describes the manner in which the organization's users use the cloud service. In this and other examples, the security management and control system can use the actions in the activity log to identify privileged users. Once the privileged users are identified, the security management and control system can monitor the privileged users with a higher degree of scrutiny.

FIG. 1 includes a block diagram illustrating an example of a computing environment 100 that includes a security monitoring and control system 102 (also referred to herein as "security management system" and "security system"). The security monitoring and control system 102 can provide threat analysis and remediation for an organization 130 that uses services 112a-112b provided by a cloud service provider 110. Because the services 112a-112b are managed externally to the networks of the organization 130, network security systems of the organization 130 may not be able to ensure that use of the services 112a-112b does not create security risks for the organization 130. In various examples, the users of the organization 130 can access and use the services 112a-112b over an network 150 or a combination of networks. The network 150 can include, for example, the public Internet. The organization 130 can similarly access and use the services of the security monitoring and control system 102 over the network 150. In various examples, the security monitoring and control system 102 can also be described as a cloud service, which is administered by a cloud service provider. An example of a security monitoring and control system is Oracle CASB, which is a product and service offered by Oracle Corporation.

A service provider is a collection of hardware and software configured to provide computing services to others. The computing services can include, for example, hardware resources, processing resources, data storage, hardware platforms, software platforms, and/or applications of various levels of complexity, among other computing resources. In some cases, the service provider operates the hardware and software that enables the provider's services. In some cases, the service provider uses the hardware and software of another service provider. For example, a first service provider can be the operator of a data center, who leases software hosting services resources to a second service provider, who then provides an application such as a collaborative word processing application to users of an organization.

In various examples, service providers follow a subscription model, and lease use of a service to others, where the lease can last for a period of time. A subscriber, who is also referred to herein as a tenant, can be given an account with the service provider and/or with a particular service, through which the tenant uses the service. When the tenant is an organization, the tenant can have an account with the service provider (referred to herein as a tenant account or an enterprise account) and the organization's users can have individual user accounts with the service provider and/or the particular service. In some cases, the user accounts are tied to the account of the tenant, and the tenant account can control and manage the user accounts.

In some examples, a service provider can provide a service without direct remuneration from subscribers. For example, a service provider can provide a free email application, and obtain revenue for the service through other avenues, such as advertising. In this and other examples, subscribers can obtain an account with the service provider without a lease and possibly for an indefinite period of time.

In the example of FIG. 1, the service provider 110 is providing two services 112a-112b that are accessible, over a network 150, to customers of the service provider 110. The services 112a-112b can include, for example, infrastructure, platforms, networks, and applications, among other services. In some examples, the two services 112a-112b can be inter-related, such as being able to share data or being accessible through a single sign-on mechanism (e.g., one set of user credentials enables a user to access both services 112a-112b without needing to separately authenticate with each service). In some examples, the services 112a-112b operate entirely independently. For example, the first service 112a can be a banking application and the second service 112b can be a software development platform. In this example, the service provider 110 may be providing the two services 112a-112b as separate and unrelated products.

Customers of the service provider 110 can include individual users and/or organizations, where an organization can include multiple users. An organization is an entity that brings people and resources together to serve a common purpose or purposes. Examples of organizations include companies, universities, utilities, and governmental entities, among others. The people of the organization can be represented in the organization as users. In the context of the computing environment 100, a user is a digital entity that can include a user name, a user identifier, a user account, credentials (e.g., a password, security token, or another form of credential), and/or other data that can be used to access and use the computing systems of the organization. One or more people can be associated with the same user account, or one person can have multiple user accounts. For example, a member of the network administration team can use the same administrative user account that is used by other members of the network administration team, while also having a user account that is used only by the one network administrator. In some examples, activities of a user can be driven by automated programs (such as "bots") instead of or in addition to being driven by a human being.

In various examples, the users of the organization and the resources of the organization are under common administration and can operate within a same security perimeter. For example, in the example of FIG. 1, the resources of the organization 130 include an enterprise network 104 and a number of client devices 106a-106c. The client devices 106a-106c can include, for example, desktop computers, laptop computers, smartphones, tablets, and other computing devices. In some examples, the client devices 106a-106c can be personally owned by employees of the organization 130, but while these devices are connected to the enterprise network 104, the devices are administered by the organization 130. The enterprise network 104 can also include other computing devices, such as servers, printers, routers, switches, and other network devices. Resources of the organization 130 can also include data (e.g. documents, webpages, business data, user data, etc.), databases, applications, processing capacity, storage capacity, networking capacity, and other hardware, software, or digital resources.

In various examples, client devices 106a-106b of the organization 130 can be connected to and operate within the enterprise network 104. For example, the client devices 106a-106b can be connected to a switch within the enterprise network 104, which puts the client devices 106a-106b behind the firewall 108 of the enterprise network 104. Being behind the firewall 108, puts the client devices 106a-106b within the security perimeter of the enterprise network 104. Within the security perimeter, the firewall 108 and other network security systems, such as Security Information and Event Management (SIEM) applications, Intrusion Detection Systems (IDS), and Intrusion Prevention Systems (IPS), among others, can defend the devices in the enterprise network 104 from network threats.

In various examples, a client device 106c of the organization 130 can be connected to the organization 130 from outside the enterprise network 104. For example, the client device 106c can be connected to the network 150 through an Internet Service Provider (ISP), and through the network 150, the client device 106c may be able to connect to a Virtual Private Network (VPN) of the enterprise network 104, or a similar mechanism. Once connected to the VPN, the client device 106c can operate as part of the enterprise network 104, and be defended by the security perimeter of the enterprise network 104. In this example, however, the client devices 106c is simultaneously connect to the network 150 that is between the client device 106c and the enterprise network 104, and thus can still be exposed to security risks that can come from the network 150. Additionally, in some examples, the client device 106c may not need to be connected to the enterprise network 104 to be able to access the services 112a-112b of the service provider 110.

In various examples, the users of the organization 130 can make use of the resources of the organization 130 and the services 112a-112b that the organization 130 subscribes to through the client devices 106a-106c. which may be owned by the organization 130 and provided to the organization's members by the organization 130. In various examples, members can use any client device of the organization 130, and may be able to use multiple client devices. For example, the enterprise network 104 can include user workstations which any member can use to log in and access the member's user account. As another example, a member may have access to a laptop computer and a smartphone, and can log into to either device to access the same user account. Alternatively or additionally, the member can use a client device personally owned by the member to connect to the organization's network to make use of the organization 130 resources.

As noted above, a subscriber of the service provider's services 112a-112b can also be an individual who is not affiliated with or part of the organization 130. The individual may have access to a network-enabled client device 106d, through which the individual can access the services 112a-112b. The individual may have a user account with an ISP that enables the individual to access the network 150. Alternatively or additionally, the individual may have a user account with one or more of the services 112a-112b or The individual is not, however, able to use the client device 106d to connect to the enterprise network 104, because the individual does not have a user account with the organization 130 or credentials that enable the a user account to gain permission to connect to the enterprise network 104.

In various examples, individuals and organizations can subscribe to services provided by different service providers. For example, an organization can use an email service (e.g. Gmail from Google®) from one service provider and a file sharing service (e.g., Dropbox) from a different service provider. In this and other examples, the different service providers can be unrelated, including have separate computing systems for supporting their respective service and being controlled by different entities. In some examples, a user can have separate accounts with each service provider and/or each service provider's service. In some examples, a user may be able to use a common user account to access the services of different service providers.

In some examples, a cloud service can be authorized or unauthorized for use within the organization 130. An authorized service is one that the organization 130 has approved for use. Approval can include, for example, vetting the service through a certification process to ensure the service is secure, establishing a service contract with the service provider 110, placing the service provider 110 on a list of approved service providers, identifying the service provider 110 as a well-known and trusted service provider, and/or controlling the generation of user accounts with the service for the users of the organization 130, among other activities. For example, the service provider 110 can be categorized by the service provider 110 as a "trusted" service provider. In some examples, the organization 130 can categorize other service providers as "untrusted," or categorize all service providers that are not on the trusted list as untrusted. An unauthorized service is one that the organization may not have specifically approved, and that a user is using at the user's own discretion. For example, a user may be using a file sharing service that the organization 130 has not specifically authorized, possibly without the organization 130 being aware that the file sharing service is being used.

In some examples, the services 112a-112b of the service provider 110 can be executed or accessed through an application that can be executed from within the organization 130, and which may be authorized for use within the organization 130. For example, the organization 130 can have an authorized web browser application, through which users can access services such as a file sharing service or a database service. In this and other examples, the web browser application can be referred to as an internal application. In some examples, the internal application can operate cooperatively with the cloud services 112a-112b, including, for example, allowing the services 112a-112b to access data, user account information, or other information within the organization 130. Because the internal application is executing within the organization 130 (for example on client devices 106a-106c of the organization 130), the organization 130 can monitor and control usage of the internal application. The organization 130, however, may not be aware of or be able to monitor users' usage, through the internal application, of the services 112a-112b of the service provider 110.

In some examples, a user can access the services 112a-112b of the service provider 110 through a third-party service provider 114. For example, a user can first access a service 116 provided by the third-party service provider 114, and through this service 116, access the service 112b of another service provider 110 (illustrated here by a dashed arrow). The service 116 of the third-party service provider 114 can be, for example, a portal service that enables users to locate and access the applications and services of other cloud service providers. In some examples, the third-party service provider's service 116 provides access to other service over the network 150 (e.g., data to and from the service 116 that is for the other service 112b is transmitted to and from the other service 112b over the network 150) though the access may appear, from the user's perspective, to be direct. In some examples, the service 116 enables a user to establish a subscription with the other service 112b, after which the user access the other service 112b directly and without needing to access the service 116 of the third-party service provider 114.

Use of the cloud services 112a-112b can create a security risk for the subscribers of the services 112a-112b. For example, hardware, platforms, and software that are operating within the organization can, in most cases, be controlled by the organization and be secured by the organization, for example using physical barriers and/or network security tools. The cloud services 112a-112b, however, operate outside of the organization 130 and outside of direct control by the organization 130. The organization 130 may have little to no visibility into the activities users perform when using the services 112a-112b, or ability to control the actions the users perform. Additionally, the organization 130 may have little or no ability to monitor or control user actions that cause questionable data or unauthorized users to enter the organization 130 by way of the services 112a-112b, or that cause the organization's data to exit the organization 130 through use of the services 112a-112b.

In various implementations, the security monitoring and control system 102 can provide network threat detection and remediation services for subscribers of the cloud services 112a-112b. In various implementations, the security monitoring and control system 102 can analyze use of services 112a-112b and identify activities that may be a threat to an organization or individual subscriber. In some implementations, the security monitoring and control system 102 can further suggestion remediation actions, and/or can automatically perform remediation actions to isolate or stop the threat. In some examples, analysis performed by the security monitoring and control system 102 can include determining models of normal and/or abnormal behavior in user activity, and using the models to detect patterns of suspicious activity. In some examples, the security monitoring and control system 102 can simultaneously analyze data from different services and/or from different services providers. In these examples, the security monitoring and control system 102 may be able to detect suspect activity that is only evident when actions performed with different services occurs. In various examples, the security monitoring and control system 102 can determine remedial measures that can be executed at a service provider where suspect activity was detected, or at a different service provider, when the analyses determines actions may need to be taken at other service providers.

In some examples, the security management and control system 102 can be integrated into the computing environment of the organization 130. For example, the security monitoring and control system 102 can executing on a server in the enterprise network 104 and behind the firewall 108 of the organization 130. In these examples, the security management and control system 102 can be administered by the organization's network administrators, and/or by personnel associated with the developer of the security management and control system 102.

Alternatively or additionally, various examples, the capabilities of the security monitoring and control system 102 can be provided as a service to individual and organizations. For example, the network security services of the security monitoring and control system 102 can be offered as web-based cloud service, and/or under a Software as a Service (SaaS) model. In these and other examples, customers can use applications provided by the security monitoring and control system 102, where the applications provide various threat detection and remediation functions. As with the services 112a-112b of the service provider 110, individuals and organizations can subscribe to the security services provided by the security monitoring and control system 102. In some examples, a group users of the organization 130 can be designated as administrative users, and can manage the operations conducted by the security monitoring and control system 102 in monitoring security for the organization 130. These users may have access information such as reports generated by the security management and control system 102 and the ability perform remediation actions suggested by the security management and control system 102, among other capabilities.

In various implementations, security monitoring and control system 102 can be implemented using a computing system. In these implementations, the computing system can include one or more computers and/or servers (e.g., one or more access manager servers), which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. The security monitoring and control system 102 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. Examples of database servers include, those commercially available from Oracle, Microsoft, and other. The security monitoring and control system 102 may be implemented using hardware, firmware, software, or combinations of hardware, firmware, and software.

In various implementations, the security monitoring and control system 102 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the security monitoring and control system 102 can include several subsystems and/or modules. The subsystems and/or modules in the security monitoring and control system 102 may be implemented in hardware, software (e.g., program code or instructions executable by a processor) executing on hardware, or combinations thereof. In some examples, the software can be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code. The computer-readable storage media may include instructions stored thereon, that when executed on a processor, perform operations of the security monitoring and control system 102.

In various implementations, the security monitoring and control system 102 can include various modules that implement different features of the security monitoring and control system 102. In the example of FIG. 1, these modules include a scanner 174, a pattern analyzer 176, a learning system 178, a data accesser 182, a data analysis system 136, an information handler system 138, a mapping generator 170, a control manager 172, a log collector system 134, and a interface 120. The security monitoring and control system 102 further includes storage 122, which stores various data that the security monitoring and control system 102 uses. In some examples, the security monitoring and control system 102 can also be connected to additional data stores 180, which can store additional data that the security monitoring and control system 102 may need.

In various examples, the storage 122 of the security monitoring and control system 102 can one or more data stores that store tenant configuration information 124, security information 126, domain information 128, and application information 132. In various examples, the storage 122 can include one or more databases (e.g., a document database, a relational database, or other type of database), one or more file stores, one or more file systems, or a combination of systems for storing data.

In various examples, the tenant configuration information 124 ("tenant config info"), can include configuration information for tenants and tenant accounts, as well as user accounts associated with each tenant account. When, for example, the organization 130 subscribes to the services of the security management and control system 102, the organization can provide the security management and control system 102 with information that identifies the organization's tenant account with the cloud service provider 110. In this example, security management and control system 102 can store the tenant account information in the tenant configuration information 124. In some cases, the organization 130 can also provide a list of user accounts with the service provider 110, which can also be stored in the tenant configuration information 124. Alternatively or additionally, in some examples, the security management and control system 102 can query the service provider 110 to determine the user accounts. In some examples, the security monitoring and control system 102 can use the association between a tenant account and the user accounts for the tenant's users in various ways, including to retrieve information about the activity of users associated with the tenant.

In some examples, the organization 130 can also provide authentication information to the security management and control system 102, where the authentication information can be used to log in to or otherwise access the services 112a-112b of the service provider 110. In various examples, the security management and control system 102 can use the authorization information to access the organization's tenant account 130 with the service provider 110. Authorization information can take the form of, for example, a token (e.g., an OAuth token), a username and password, or another form of credential. In some examples, the organization 130 can specify permissions or privileges with the authorization, which can define the level of access the security management and control system 102 has to the organization's tenant account. For example, the organization 130 can specify that the security management and control system 102 can change security settings for a service provided by the service provider 110, but that the security management and control system 102 cannot generate new user accounts or delete uer accounts.

In various examples, the tenant configuration information 124 can store other information for the organization 130, such as, for example security, settings for accessing the services 112*a*-112*b* of the service provider 110, log settings, and/or access settings (e.g., security policies, security configurations, and whitelists and blacklists, among other things). In some examples, the organization 130 can specify a security setting for a service based on a level. For example, a security setting at a high level may require that user passwords be "strong," meaning, for example, that the password must include a variety of characters such as upper and lower case, numbers, and/or symbols. Similarly, security settings at different levels may set a session inactivity timer at higher or lower periods of time, such that, when the inactivity timer expires, the user's session is automatically ended, for example.

In some examples, the storage 122 can include security information 126 ("security info") that includes security analysis performed by the security monitoring and control system 102. In some examples, the security information 126 can include separate entries for different customers of the security monitoring and control system 102. In some examples, the security information 126 includes historic data: the results of past analysis (e.g., from the last month, last three months, last year, or some other past time period) which can be consulted when needed. In some examples, the security information 126 can further include records of past security incidents, determinations of whether the past security incidents were actual incidents or false positives, records of remediation actions taken for past incidents, and/or outcomes of performing remediation actions, among other data. In some examples, the security information 126 can further include network threat intelligence data, obtained, for example, from third-party threat intelligence aggregators and distributors.

In some examples, the storage 122 can include domain information 128 ("domain info") about the service provider 110 and other services providers. The domain information 128 can include, for example, a network address or location of the service provider 110, identification information for an owner or operator of the service provider 110 (e.g., the person or organization that owns and/operates the service provider 110) and information for verifying the identity of the service provider 110. The domain information 128 can be obtained, for example, by querying the service provider 110, requesting a certificate from the service provider 110, and/or requesting information from the service provider's ISP or the service provider's hosting service.

In some examples, the storage 122 can include application information 132 ("app info") that records user of a service provider's applications or services. The application information 132 can include, for example data logs collected from the organization 130 and/or activity logs obtained from the service provider 110. The application information 132 can record, for example, actions performed during use of the services 112*a*-112*b* of the service provider 110 as well as identification of the users who performed the actions, timestamps for when the actions were performed, network identification of network and/or geographic locations for the users when the users performed the actions, resources affected by the actions, and other information related to use of the services 112*a*-112*b*.

In various implementations, the security monitoring and control system 102 may be coupled to or in communication with one or more data stores 180. The data stores 180 may be implemented using any type of persistent storage device, such as a memory storage device or other non-transitory computer-readable storage medium. In some examples, the data stores 180 can include or implement one or more databases (e.g., a document database, a relational database, or other type of database), one or more file stores, one or more file systems, or combinations thereof. The data stores 180 may be implemented by and/or accessible as a service provided by a service provider system. The data stores 180 may include an interface for requesting data related to service or the service's service provider.

In some implementations, the security monitoring and control system 102 can include a log collector system 134 that performs operations for obtaining data on which the security monitoring and control system 102 can perform analysis. In various examples, the security monitoring and control system 102 can use different types of data or data sources for conducting threat analysis. For example, the security monitoring and control system 102 can use data obtained by monitoring the client devices 106*a*-106*c* through which the services 112*a*-112*b* are used, and/or obtained by monitoring points within an organization's network, such as at routers or the firewall 108. Herein, data obtained from client devices or within the organization's network is referred to as network data. To obtain network data, in some examples, monitoring agents can be placed on the client devices 106*a*-106*c* and/or on the network infrastructure of the organization's network. In these examples, the monitoring agents can capture user activity as a user makes use of cloud services.

As another example, the security monitoring and control system 102 can use data logs from the service provider 110. In various examples, the service provider 110 can record user activity as the services 112*a*-112*b* of the service provider 110 are used. For example, the service provider 110 can record when users log into a service, a network and/or geographic location for a user when the user logs in, actions performed by the user when the user uses a service, a resource affected by the action, and other information related to use of a service. Data from service providers are referred to herein as activity data or activity logs.

The following examples illustrate some examples of activity data that can be obtained from service providers. The following is a first example of activity data (e.g., an audit log record) that can be obtained from a service provider:

```
"entries": [
{
    "source": {
    "type": "user",
    "id": "222853877",
    "name": "Sandra Lee",
    "login": "sandra@company.com"
    },
    "created_by": {
    "type": "user",
    "id": "222853866",
    "name": "Mike Smith",
    "login": "mike@company.com"
    },
    "created_at": "2016-12-02T011:41:31-08:00",
```

-continued

```
    "event_id": "b9a2393a-20cf-4307-90f5-004110dec233",
    "event_type": "ADD_LOGIN_ACTIVITY_DEVICE",
    "ip_address": "140.54.34.21",
    "type": "event",
    "session_id": null,
    "additional_details": null
}
```

The following is a second example of activity data (e.g., a shared file audit log record) that can be obtained from a service provider.

```
"entries": [
{
    "type": "event",
    "source": {
        "parent": {
            "type": "folder",
            "id": "0",
            "name": "All Files"
        },
        "item_name": "financial2017Q1.doc",
        "item_type": "file",
        "item_id": "159004949136"
    },
    "additional_details": {
        "service_name": "File Sharing App"
    },
    "event_type": "SHARE",
    "ip_address": "140.191.225.186",
    "event_id": "234d2f55-99d0-4737-9c3b-1a5256fe7c67",
    "created_at": "2016-12-12T20:28:02-07:00",
    "created_by": {
        "type": "user",
        "id": "238746411",
        "name": "John Smith",
        "login": "john@company.com"
    }
}
```

The following is a third example of activity data (e.g., an audit record) that can be obtained from a service provider.

```
{
    "Records": [
    {
        "eventVersion": "1.03",
        "userIdentity": {
            "type": "IAMUser",
            "principalId": "111122225533",
            "arn": "arn:aws:iam::111122223333:user/john",
            "accountId": "111122223335",
            "accessKeyId": "AKIAIOSFODNN7JOHN",
            "userName": "john"
        },
        "eventTime": "2016-12-26T20:46:31Z",
        "eventSource": "s3.amazonaws.com",
        "eventName": "PutBucket",
        "awsRegion": "us-west-2",
        "sourceIPAddress": "127.0.0.1",
        "userAgent": "[ ]",
        "requestParameters": {
            "bucketName": "myprodbucket"
        },
        "responseElements": null,
        "requestID": "47B8E8D397DCE7D6",
        "eventID": "cdc4b7ed-e171-4cef-975a-ad829d4123c7",
        "eventType": "AwsApiCall",
        "recipientAccountId": "111122223344"
    }
}
```

The following is a fourth example of activity data (e.g., an audit record) that can be obtained from a service provider.

79a59df900b949e55d96a1e698fbacedfd6e09d98eacf8f8 d5218e7cd47efcde myprodbucket [06/Feb/202017:00: 01:57+0000] 192.0.2.3 Mary DD6CC733AMARY REST.GET.OBJECT s3-dg.pdf"GET/mybucket/ financial2016Q4.pdf HTTP/1.1" 200--4406583 4175428"-" "S3Console/0.4"-

In some examples, the security monitoring and control system 102 can use data from other data sources, such as third-party feeds from network sources other than the organization's network or the service provider 110. Examples of other network sources can include network security data aggregators and distributors, social networking systems, news reporting or aggregating systems, governmental systems, reputation systems, and other systems.

In various implementations, the log collector system 134 can perform operations to obtain network data and/or activity data. For example, the log collector system 134 can be configured to communicate with software agents placed with the enterprise network 104 to network data logged by these agents. In this example, the network data can include network traffic generated as a user uses the services 112a-112b of the service provider 110 or the services of another service provider. In some examples, the network data can include other network traffic, such as network traffic generated as a user uses other network resources, such as resources of the organization 130 or resources on the Internet, such as websites. As another example, the log collector system 134 can be configured to communicate with the service provider 110 to obtain activity logs from the service provider 110. The service provider 110 can have, for example, and API that enables the log collector system 134 to request activity logs. In these examples, the log collector system 134 may be able to use the credentials of a tenant account with the service provider 110 to request the activity logs; that is, the log collector system 134 can pose as a tenant of the service provider 110 and make a request in the same way as would the tenant.

In various implementations, data obtained by the log collector system 134 can be processed by a data analysis system 136 in security monitoring and control system 102. The data analysis system 136 can conduct analysis on network data and activity data to perform operations such as discovery of applications being used, activity pattern learning and recognition, anomaly detection, and network threat detection, among other operations. These and other operations that can be performed by the data analysis system 136 are discussed further below.

In various implementations, the information handler system 138 of the security monitoring and control system 102 manages the data in the storage 122, including, for example, storing data, locating and retrieving data, organizing data, and updating data, among other operations. In some examples, the information handler system 138 received data from users of the organization 130, such as administrative users, who can provide information such as lists of the organization's users and data about the users. The data about the users can include, for example, roles or privileges for a user. In these and other examples, the information handler system 138 can manage storing of the user data in the appropriate data store in the storage 122.

In various implementations, the mapping generator 170 performs security analysis the organization 130 or another customer of the security monitoring and control system 102. For example, the mapping generator 170 can operate on output of the data analysis system 136 and compute a measure of security for a service, a user, a tenant, or combinations of services, users, and/or tenants. In some examples, the mapping generator 170 can obtain data from the interface 120 to perform security analysis. Security analysis operations are discussed further below.

In various implementations, a control manager 172 in the security monitoring and control system 102 can act on behalf of the organization 130 to manage access to the services 112a-112b of the service provider 110 by the organization's users. In various examples, the control manager 172 can provide this service for multiple cloud services or any cloud service that the organization's users use. In some examples, the control manager 172 can use access policies to control users' access to the services 112a-112b. An access policy can define, for example, types or categories of users that can or cannot use a service, specific users that can or cannot use a service, times of day or days of the week when a service can be used, an amount of data that can be transferred to or from the services, an amount of data bandwidth that can be used, actions that can or cannot be performed in using the service, to which users the access policy applies, and/or other restrictions or permissions with respect to the service. In various examples, the control manager 172 can maintain a set of policies for each organization that subscribes to the services of the security management and control system 102. In some examples, the control manager 172 can provide pre-sets with different levels of security, where selecting a pre-set selects the security configuration for one or more services. In these examples, the organization's selection of a pre-set can affect some or all of the organization's users ability to use the services.

In some examples, the control manager 172 can also maintain security policies for the organization 130. A security policy can define an action or set of actions that, when detected, constitute a security violation or an event that otherwise requires attention. In some examples, actions that are defined by a policy as a security violation can occur through use of one service, meaning that all the actions were performed while using the same service. In some examples, the actions can have occurred during use of more than one service, where the services are provided by one service provider or multiple service providers. In some examples, a security policy can also define one or more remediation actions to perform when a violation of the policy is detected. A remediation action can include, for example, sending a notification to the user who caused the violation, to network administrators of the organization 130, to administrators of the security management and control system 102, and/or to another entity.

In some examples, remediation can include modifying access to a service or to multiple services. For example, a remediation action can include preventing a particular user from using a service, or preventing all users of the organization 130 from using the service. As another example, a remediation action can include limiting the actions that can be performed in using a service. In some examples, performing a remediation action can include sending instructions to the enterprise network 104. In these examples, the instructions can, for example, configure a client device or a network infrastructure device such as the firewall 108. The client devices 106a-106c and/or the network infrastructure devices may, in some examples, be executing a software agent that enables the control manager 172 to communication with the devices, and make modifications to the devices. Modifications can include, for example, restricting access to a domain or IP address, blocking all network traffic, disabling the device, or making some other modification to the device.

In some examples, performing a remediation action can include sending instructions to the service provider 110 to modify access to the services 112a-112b. In these examples, the remediation action can include determining instructions to send. For example, the control manager 172 can examine an API of the service provider 110 and/or of a service to identify instructions that can be performed to cause a desired change to the service. In this example, the API can define instructions that can, for example, prevent or limit access to the service by a user or a group of users of the organization 130. As another example, the API can define instructions that can disable or enable certain functionality of the service, wherein the disabling or enabling affects one or more users of the organization 130. In these and other examples, the modification to the service affects the users of the organization with which the remediation is associated, and does not affect the users of a different organization.

In various implementations, the security monitoring and control system 102 can include a learning system 178. The learning system 178 can apply various machine learning algorithms to data collected by the security monitoring and control system 102. The information learned about the data can then be used, for example, by the data analysis system 136 to make determinations about user activities in using services provided by the service provider 110. For example, the learning system 178 can learn patterns of normal or common behaviors of users of an organization. In these and other examples, the learning system 178 can generate models that capture patterns that the learning system 178 has learned, which can be stored in the storage 122 along with other data for an organization.

To support the learning system 178, in some implementations, the security monitoring and control system 102 includes a scanner 174 and a pattern analyzer 176. In these implementations, the scanner 174 can, for example, scan data for particular types of information. For example, the scanner 174 can extract the activities of a particular user, group of users, class of users, and/or all users associated with a particular tenant. As another example, the scanner 174 can extract activities relating to use of a particular service or set of services. As another example, the scanner 174 can extract activities relating to a particular service provider. In various implementations, the pattern analyzer 176 can use the data extracted by the scanner 174 to identify patterns in the data. For example, users and/or organizations may use services in repetitive ways or in cyclical ways. In these examples, the pattern analyzer 176 can identify repetitive behavior, and identify these patterns of behavior to the learning system 178.

In some examples, a data accesser 182 in the security monitoring and control system 102 can communicate with service providers to obtain activity data from those service providers. The activity data may be for a user account, a tenant account, a group account, or another type of account. The activity data may be obtained for a service, a particular type of data (e.g., a data for a particular attribute), one or more users, or combinations services, service providers, attributes, users, or other factors. In some examples, the data accesser 182 may process data to identify activity related to one or more criteria, such as one or more services, a particular type of data (e.g., a data for a particular attribute), one or more users, or combinations thereof In various implementations, the security management and control system 102 provides an interface 120 through which customers of the security management and control system 102 can use the services of the security management and control system 102. The interface 120 can provide, for example, a graphical user interface (GUI) that can display a control panel or dashboard that enables the organization's administrative users to configure the services of the security management and control system 102. The graphical user interface can further enable the administrative users to view reports of user activity with respect to the services 112a-112b of the service provider 110. The graphical user interface can further provide reports of security events and suggest remediation actions, and/or report on the outcome of remediation actions that the security management and control system 102 automatically performs. The graphical user interface can be implemented, for example, as software application that can be executed on the client devices 106a-106c of the organization 130. Alternatively or additionally, the graphical user interface can be implemented as a web-based interface (e.g., a website).

In some examples, the interface 120 can alternatively or additionally provide an API through which the organization 130 can manage the services provided by the security management and control system 102. The API can define actions to, for example, pull reports on user activity in using cloud services, pull reports on security events, issue instructions for remediation actions, obtain statistics on user activity, and/or other actions related to the services of the security management and control system 102. The API of the interface 120 can enable an organization to, for example, integrate the capabilities of the security management and control system 102 into the security infrastructure of the organization 130.

A system for security monitoring and control, in various implementations, can include multiple components that may be located on a single hardware platform or on multiple hardware platforms that are in communication with each other. Components can include software applications and/or modules that configure a server or other computing device to perform the operations of the security management and control system 102.

Figure 2:
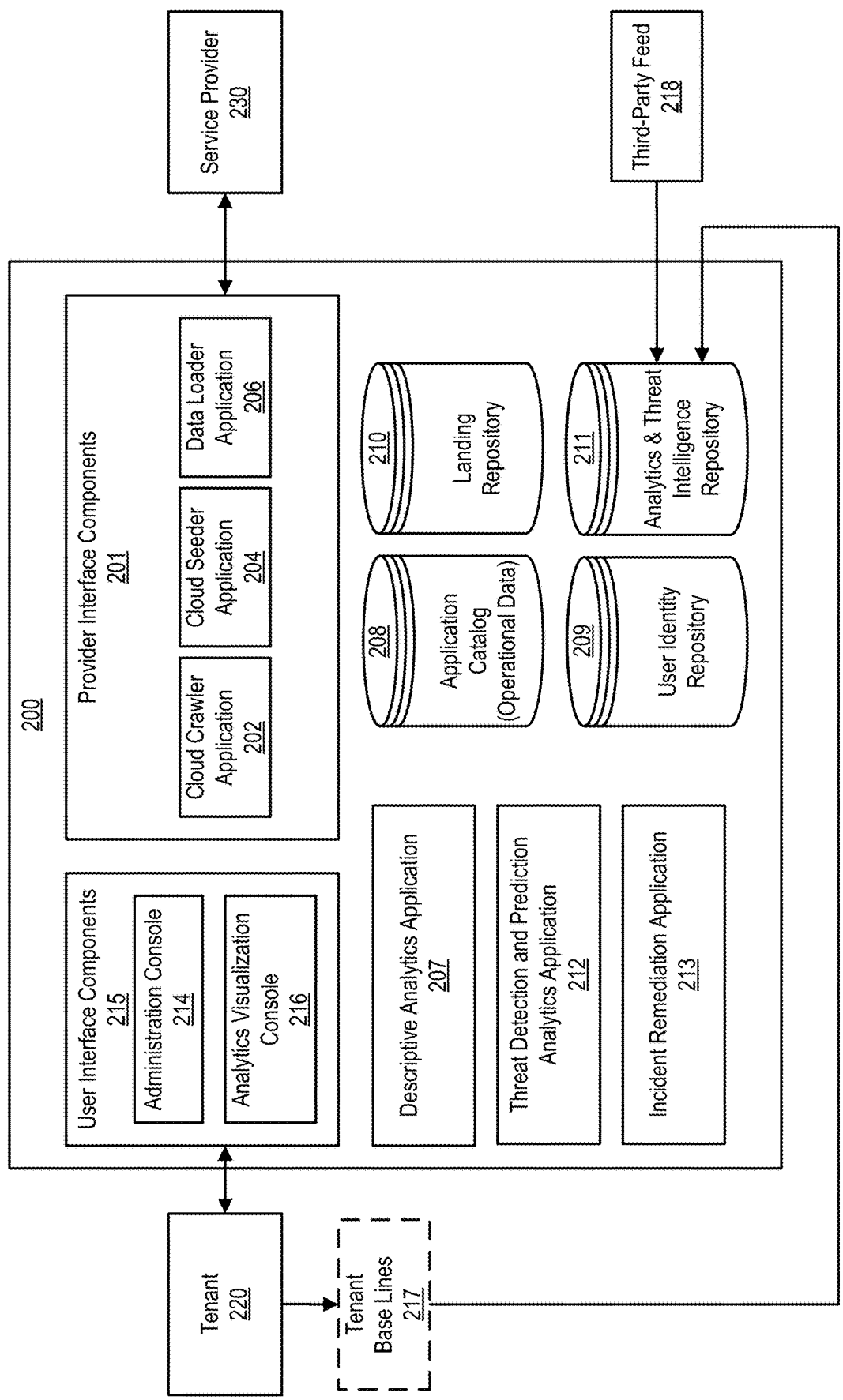
FIG. 2 illustrates a block diagram of an example cloud security system that can be implemented by a security management and control system.

FIG. 2 illustrates a block diagram of an example cloud security system 200 that can be implemented by a security management and control system. In various implementations, the example cloud security system 200 can conduct network threat analysis for a tenant 220 of a service provider 230, and determine whether actions by users of the tenant 220 in using a service of the service provider 230 constitute a network threat. In various implementations, the cloud security system 200 can include user interface components 215 for interfacing with a tenant 220 and provider interface components 201 for interfacing with a service provider 230. On the back end, the cloud security system 200 can include various applications for conducting analytics and data stores for storing data used in the analytics.

In the context of the example of FIG. 2, the tenant 220 is a tenant of the service provider 230, meaning that the tenant 220 is using a service of the service provider 230. When the cloud security system 200 is provided as a cloud service, the tenant 220 can also be a tenant of the cloud security system 200, n that the tenant 220 is using the services of the cloud security system 200.

In various examples, the user interface components 215 include an administration console 214 and an analytics visualization console 216. Using the administration console 214, the tenant 220 can configure the security controls for the services of the service provider 230. Configuration of the security controls can include, for example, enabling or disabling or disabling access to the service by the tenant's users, enabling or disabling features of the service that the tenant's users can use, and other configurations that are available to the tenant 220. The analytics visualization console 216 can be used to view analytics generated by the cloud security system 200. For example, using the analytics visualization console 216, the tenant 220 can view reports of security incidents involving the tenant's users and a service to which the tenant 220 is subscribing. In various examples, the information displayed in the administration console 214 and the analytics visualization console 216 can be obtained from the data stores of the cloud security system 200.

In various implementations, the administration console 214 can provide the tenant 220 with a normalized view of controls for multiple cloud service and/or cloud service providers. The administration console 214 can include a user interface that displays a simplified view of controls for different cloud services on the same screen. Information provided to the administration console 214 can be retrieved from an application catalog database 208 using metadata based schema mapping. In some examples, administration console 214 can be used to assign consistent access policies across cloud services. In these examples, administration console 214 can display controls and/or set controls according to specified classifiers, such as, for example, standard, stringent, or custom, among others. In this example, a higher level classification corresponds to more stringent controls. In some examples, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In some examples, the administration console 214 can also provide for plug-in interfaces to integrate with SaaS, PaaS, and native applications.

In various implementations, the analytics visualization console 216 can display security indicators in a library format with risk factors that are color coded (such as red, green, yellow). Other statistics or metrics may be displayed such as, for example, user logins attempts, groups with the most newly added users, deleted files, users with the most deleted files, and/or users downloading the most files, among other metrics. Some types of information may be specific to a particular service provider. For example, for Salesforce.com, the metrics can include the identities of users that are downloading opportunity or budget data, contracts, or contacts. In some examples, the analytics visualization console 216 provides a unified view of security controls for a tenant's cloud services. The analytics visualization console 216 may display a values set for any or all security controls set for different cloud services, as well as deviations of the current values from values associated with predetermined policies or configurations.

In various examples, the provider interface components 201 can applications that the cloud security system 200 can use to interface with the service provider 230. These components can include a cloud crawler application 202, a cloud seeder application 204, and a data loader application 206.

In various examples, the cloud crawler application 202 can retrieve information about security controls from the service provider 230. Data retrieved by the cloud crawler application 202 can be entered into an application catalog database 208. Retrieving information can include, for example, sending requests to the service provider 230 that are formulated to ask the service provider 230 for the security controls that are available for a service, and any available settings for the security controls. Alternatively or additionally, the service provider 230 can include an API through which the cloud crawler application 202 can obtain security controls for a service. In various examples, a cloud crawler application 202 can retrieve software defined security configuration data from the service provider 230. Software defined security configuration data can describe the configuration of security controls for a particular service. Security controls are mechanisms that restrict access to the application and/or data housed by the cloud service provider. For example, software defined security configuration data can include data describing roles that are defined for users, groups, and grouping of users; encryption keys; tokens; access controls; permissions; configurations; types of authentication policies; mobile access policies; and many other types of security controls.

In various examples, the cloud crawler application 202 can connect to the service provider 230 in order to obtain software defined security configuration data. The service provider 230 may require authorization or some other manifestation of consent for access to the service provider's systems. Authorization may be provided by a token (such as using the Open Authorization (OAuth) open standard for authorization) or by credentials (such as a username and password). The token or credentials can be that of the tenant 220, or a token or credential associated with the cloud security system 200. Various other techniques can be used to authorize access to a cloud provider's system and data. The connection may also include providing a service URL.

In various examples, the software defined security configuration data can be collected by using an API of the service provider 230. Examples of APIs and classes of APIs include Representational State Transfer (REST), Java 2 Platform, Enterprise Edition (J2EE), Simple Object Access Protocol (SOAP), and native programmatic methods (such as native application API's for Java), among others. The information could also be requested using other techniques, such as scripting languages (such as Python and PHP), deployment descriptors, log files, database connectivity through Java Database Connectivity (JDBC) or REST, and resident applications (such as cloud beacons). The information that is sent or received can be represented in a variety of format, such as, JavaScript Object Notation (JSON), Extensible Markup Language (XML), or (Comma Separated Values (CSV), among other formats.

Table 1 below provides an example of some security controls provided by cloud services providers Box and Amazon Web Services (AWS). Other cloud services providers can have similar security controls or other security controls.

TABLE 1

| Security Controls | Support in Box | Support in Amazon Web Services (AWS) |
|---|---|---|
| Users/Group Management | REST (Representational State Transfer) API | AWS IAM (Identity and Access Management) APIs |
| Credentials and Identifiers | N/A | Secure and monitor Accounts, tokens, keys etc. |
| Login/Logout Events | REST API | AWS CloudTrail - Events API and Log files |
| IP address of the clients | REST API | AWS CloudTrail - Events API and Log files |
| Device (iphone, ipad etc) used by the clients | REST API | AWS CloudTrail - Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |
| Restrict or limit Mobile access | Limit users from saving content for offline access | AWS IAM policies |
| Roles | BOX has pre-defined admin roles | Roles can be created using pre-defined policies |

Table 2 provides an example of some of the security controls and supported access for cloud services provider Salesforce.com. Other cloud services providers can use similar or other security controls and access controls.

TABLE 2

| Security Controls | Support in Salesforce.com |
|---|---|
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad, etc.) used by the clients | API to manage Setup changes |
| Password Policies | APIs: Setup changes |
| Resource Access Permissions | Salesforce object monitoring using object history |
| Restrict or limit Mobile access | APIs to manage Setup changes |
| Roles | Salesforce Profiles |

In various examples, the cloud crawler application 202 can generate security controls metadata from the software defined security configuration data obtained from the service provider 230. The security controls metadata is normalized descriptors for entering the information into a common database such as the application catalog database 208. The security controls metadata can be categorized (e.g., mapped into categories) and indexed. The categorization may comply with a standard specified by a security organization and/or may be certified and/or audited by a third party. In addition, the security controls metadata and/or the categorization of metadata may be formulated around the requirements of a particular regulation or standard. For example, regulations and standards such as the Health Insurance Portability and Accountability Act (HIPAA), the Sarbanes-Oxley Act, the Federal Risk and Authorization Management Program (FedRAMP), and/or the Payment Card Industry Data Security Standard (PCI DSS) may require reporting and audit trails. The security controls metadata can be formatted in a way to display the types of information required by the regulations and standards and facilitate the generation of reports needed.

The security controls metadata can be stored in the application catalog database 208. In some examples, the application catalog database 208 is an Apache Cassandra database, an open-source NoSQL database management system designed to handle large amounts of data across many commodity servers. In some examples, the application catalog database 028 is implemented using types of databases appropriate to the application. In some examples, a variety of databases can be used to store an application catalog for later retrieval, report generation, and analytics generation.

In various implementations, other methods can be used to retrieve software defined security configuration data and to generate security controls metadata. Additionally, various types of controls and mechanisms for retrieving software defined security configuration data may be supported by different cloud service providers. For example, other cloud applications such as Office 365, GitHub, Workday, and various Google applications use retrieval mechanisms specific to a service. Furthermore, processes for retrieving software defined security configuration data can be automated, depending on what is supported by a cloud service provider.

In various implementations, the cloud seeder application 204 can be used to implement security policies for the tenant 220. The cloud seeder application 204 can, for example, set security controls for a tenant's accounts with the service provider's services The security controls can affect, for example, one user account, multiple users accounts, or all user accounts. In some examples, the cloud seeder application 204 can set security controls in various situations. For example, the cloud seeder application 204 can set security controls as part of remediation of a threat or when called on by the tenant 220. In various examples, the cloud seeder application 204 can be used to coordinate consistent access policies across cloud services. In some examples, security controls can be coordinated across several accounts that an organization has with different service providers. For example, different levels of security may be defined such that, when a higher or lower level of security is selected, the security controls for an organization's accounts with different cloud services are all set to reflect the higher or lower level of security. In this way, a unified policy and security controls configuration can be enforced. The values for various security controls at different levels of security can be defined by input into a user interface, such as a controls management platform discussed above, and the values associated with the security controls at each level of security can be stored in a database. A user interface can be provided to show security controls for a organization's account with a cloud service and the assignment of security control values at a security level. As an example, security controls at a "stringent" level of security can include password requirements for a user account such as ten minimum characters, two numbers, one special character, one uppercase letter, no reuse of the last ten passwords, etc.

In various implementations, the data loader application 206 can retrieve activity data for the tenant 220 from the service provider 230. The activity data can come from logs generated by the service provider 230 as the tenant's users use the service providers services. In various examples, the data loader application 206 can obtain the activity data by requesting the data from the service provider 230. The data retrieved by the data loader application 206 can be entered into a landing repository 210 and/or analytics and threat intelligence repository 211. The data entered into a landing repository 210 may be in different formats and/or have different ranges of values, due, for example, from having been collected from different service providers. In some examples, the data from the data loader application 206 can be reformatted and/or structured before being moved to the analytics and threat intelligence repository 211 so that, for example, the data has a uniform format.

In various examples, the data loader application 206 can obtain activity data by connecting to and communicating with the service provider 230. In various examples, the connection is made over an encrypted communication channel. In some examples, the connection can be authenticated by a token or using login credentials, or another authentication method. In some examples, collection of activity data is scheduled to occur periodically (e.g., every four hours, every six hours, or at some other time interval). In some examples, the schedule for collection is configurable by the tenant 220. In some examples, the data loader application 206 collects data in real time as events occur, using a real-time computation system such as, for example, Apache Storm, open source distributed real-time computation system. The data loader application 206 may be configured to designate certain events or activities as high risk events, and these events can be retrieved near real-time, outside of the scheduled retrieval interval.

In various examples, activity data can include various types of information about the user of the service provider's services. For example, activity data associated with user accounts can include information relating to the use of, and/or actions taken with, a user account for a service. In this example, the activity data can include sources of information such as user logs and/or audit trails. More specific types of activity data can include, for example, login and logout statistics (including attempts and successes), file operations, access metrics, network download/upload metrics, application metrics (e.g., use, operations, functions, etc.), IP addresses used to access a service, devices used to access service, and/or cloud resources that were accessed (such as, for example, files and folders in a file management cloud application [such as Box], employees and contractors in a human resource cloud application [such as Workday], and/or contacts and accounts in a customer relationship management cloud application [such as Salesforce]). In various examples, activity data can include the user account or other user identifier for the user associated with the events or statistics. In various examples activity data can include information about system status or activity of a cloud system such as, for example, server activity, server reboots, security keys used by a server, and system credentials, where this information is visible or accessible to a system using authorized credentials.

In some examples, activity data may also include information about the security configuration of a tenant account, possibly including the security configuration of user accounts associated with the tenant account. The security configuration can include the values to which security controls for a tenant and/or user accounts associated with the tenant are set.

In various examples, the data loader application 206 can store retrieved activity data in the analytics and threat intelligence repository 211. The analytics and threat intelligence repository 211 can be any database or data repository with query capability. In some examples, the analytics and threat intelligence repository 211 is built in a NoSQL based infrastructure such as Apache Cassandra or another distributed data processing system, although any data warehouse infrastructure may be used as appropriate for the application. In some examples, the data is first entered into the landing repository 210 and reformatted and/or structured before being moved to the analytics and threat intelligence repository 211.

In some examples, the activity data may be received in different formats that are used by different service providers or services. For example, the data may be formatted in JSON or other data interchange formats, or may be available as log files or database entries. In some examples, the data loader application 206 performs operations for normalizing the data and reformatting the data into a common format for storage in, and retrieval from, the analytics and threat intelligence repository 211. Reformatting the data may include categorizing and structuring the data into the common format. In some examples, the database is adaptive to structural changes and new values, and can run automated processes to check for changed data. In some examples, the cloud crawler application 202 recognizes differences in the structure or values of the data retrieved, and can apply the changes to the application catalog database 208 and/or the analytics and threat intelligence repository 211.

In some examples, the data loader application 206 can pre-generate system reports. The system reports can be generated by jobs (e.g., processes) that are scheduled to run on the data set at periodic intervals. Data stored in an application catalog database 208 and/or analytics and threat intelligence repository 211 can be used to generate a variety of reports. Categories of reports can include, for example, authentication and authorization, network and device, systems and change data, resource access and availability, malware activity, and failures and critical errors, among others. Reports can be based on various attributes such as, for example, per application, per user, per secured resource, and per device used for access, among others. Reports may highlight recent changes such as updated features in a cloud application or newly modified policies. Reports may be pre-generated by scheduled jobs (e.g., for performance reasons) or may be requested by a user or administrator.

In some examples, reports include analytics generated on the data. Analytics may use Apache Software Foundation technologies such as Hadoop, Hive, Spark, and Mahout or other features as available in the data storage framework used. In some examples, the R programming language is used to generate analytics. In some examples, the generation of analytics includes the use of machine learning algorithms, proprietary algorithms, and/or external threat intelligence from external commercial sources such as FireEye and Norse or public threat intelligence communities such as Zeus and Tor.

In various implementations, the aggregation of activity information in the analytics and threat intelligence repository 211 concerning access patterns and other event statistics enables the system 200 to establish baselines of behavior. Machine learning techniques, for example, can be applied to detect threats and provide recommendations concerning how to respond to threats. Threat models can be developed to detect threats that are known or unknown or emerging. Threats can also be identified by comparing activity data with external threat intelligence information, such as information provided by third-party providers, as discussed further below. In various examples, data in the analytics and threat intelligence repository 211 can further be used to generate reports that may be presented visually to a system administrator via a user interface and to generate analytics for determining threat levels, detecting specific threats, and predicting potential threats, among other things.

In some examples, a single user of the tenant 220 can have multiple accounts with the service provider 230 and/or with the services provided by the service provider 230. In various examples, the various user accounts of one user can be associated together in a user identity repository 209. In some examples, the user identity repository 209 can group together the user accounts the user has with multiple service providers. In some examples, the tenant 220 can have a tenant account with the service provider 230. In these examples, the user identity repository 209 can associate users of the tenant 220 with the tenant account, which can associate the user accounts of the users with the tenant account as well. The association of user accounts to tenant accounts may be used in various ways, such as retrieving information about the user activity of the tenant's users. In some examples, the tenant account's credentials with the service provider 230 may be used to log into the service provider 230 to retrieve activity data for user accounts that are associated with the tenant account.

In various implementations, the user identity repository 209 can also be used to facilitate tracking of user activity and generation of profiles, where a profile can describe a particular user's use of a cloud service or of multiple cloud services. In some examples, the cloud security system 200 can use the profile of a user to take actions that affect multiple cloud services. For example, the cloud security system 200 can preemptively alert a system administrator when a user's activity in using several cloud services may be a security risk. Alternatively or additionally, as another example, the cloud security system 200 can proactively secure other services on which a user maintains data by applying remedial measures, such as adding additional steps to authentication, changing passwords, blocking a particular IP address or addresses, blocking email messages or senders, or locking accounts, among other things.

In various implementations, the cloud security system 200 can include applications or software modules to perform analytics on data collected by the cloud security system 200. The applications or software modules may be stored in volatile or non-volatile memory and, when executed, can configure a processor to perform certain functions or processes. These applications can include a descriptive analytics application 207 and a prediction analytics application 212. In some examples, the descriptive analytics application 207 can generate analytics such as statistics on users, user activity, and resources used by the users. In some examples, the threat detection and prediction analytics application 212 can generate analytics using machine learning and other algorithms. The analytics performed by the prediction analytics application 212 can include identifying and predicting security threats from patterns of activity and behavioral models. Analytics performed by the descriptive analytics application 207 and the prediction analytics application 212 can be performed using data stored in the analytics and threat intelligence repository 211.

In various implementations, the cloud security system 200 can include remediation functions that provide manual and/or automated processes for responding to threats. In some examples, analytics can use information received from tenant systems that describes threat intelligence provided by the tenant. These sources, which are referred to in the example system 200 as tenant base lines 217, can include information such as specific IP addresses to watch or block, users to watch or block, email addresses to watch or block, software vulnerabilities to monitor, browsers or browser versions that can be susceptible to misuse, and/or vulnerable mobile devices or versions of mobile hardware or software, among other things. In some examples, analytics can use information received from an external third-party feed 218. The source of the third-party feed 218 can be, for example, a threat intelligence aggregator or distributor. The information from the third-party feed 218 can be used to augment the threat analytics of the cloud security system 200 by providing external information about security threats. The external information can include, for example, identification of infected node points, malicious activity from a particular source IP address, malware infected email messages, vulnerable web browser versions, and known attacks on clouds, among other things.

In various implementations, an incident remediation application 213 can be used to coordinate and/or perform remediation actions in response to detected threats. In some examples, the incident remediation application 213 may be called when a recommended remediation action is presented and selected in an alert. The incident remediation application 213 may perform the selected remediation action or instruct another application, such as a cloud seeder application 204, to perform the selected remediation action. When the selected remediation action is to be manually performed or is external to the security system 200, the incident remediation application 213 can track the status of the remediation action and whether the remediation action is complete. In some examples, the incident remediation application 213 can be used to store the results of a manual or automated remediation action. In some examples, a selected remediation action is to be performed by a system external to the security system 200, such as by a third-party's or a tenant's incident remediation system. In these examples, the incident remediation application 213 can instruct or invoke the third-party's or tenant's incident remediation system to perform the action. For example, the incident remediation application 213 may have access to an automated integration process of the third-party or the tenant 220.

Figure 3:
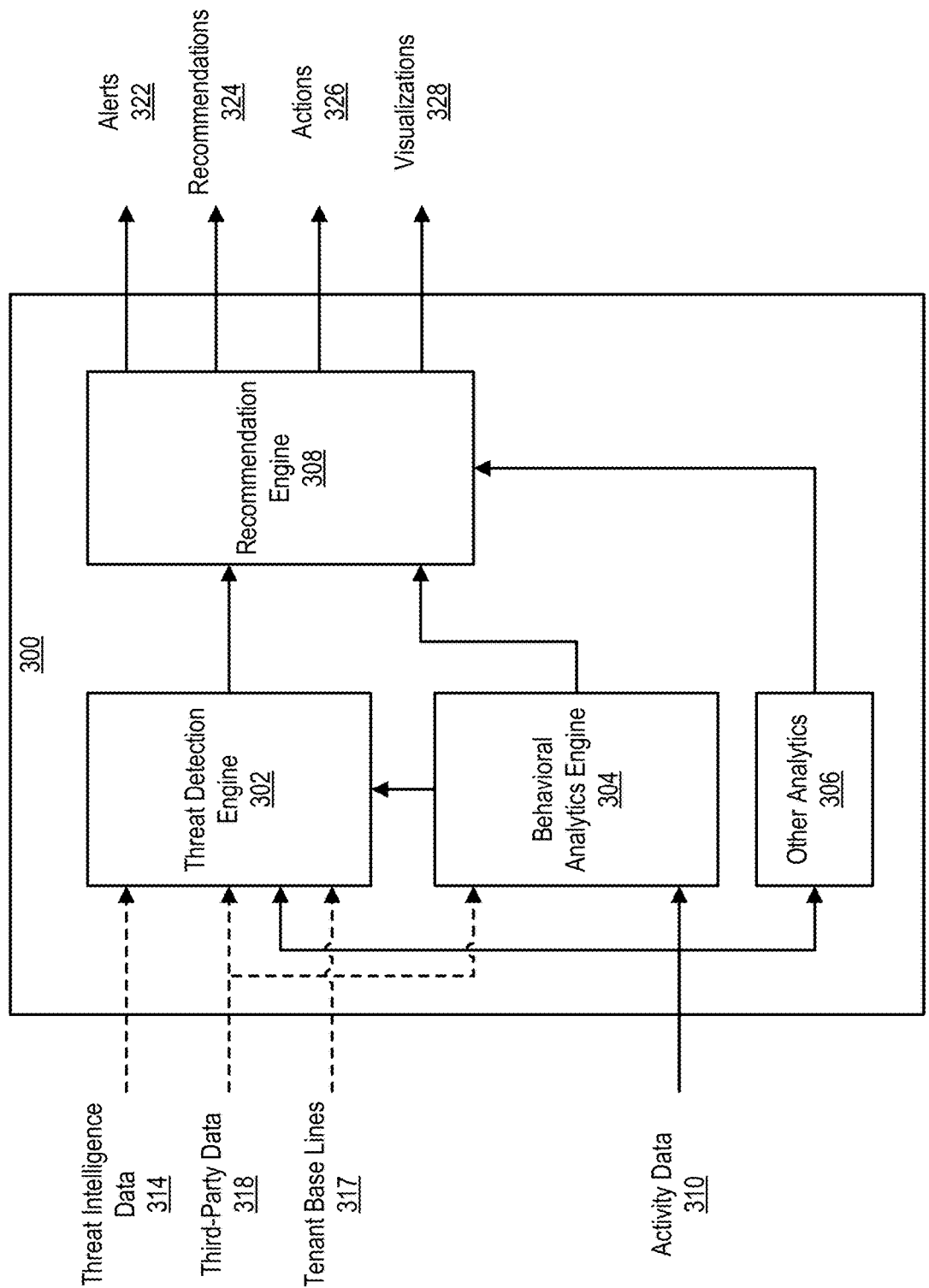
FIG. 3 illustrates a block diagram of an example analytics engine of a security management and control system.

FIG. 3 illustrates a block diagram of an example analytics engine 300 of a security management and control system. In various examples, the analytics engine 300 can analyze various data sources to identify network threats for an organization whose users are using cloud services. In various examples, the operations of the analytics engine 300 can be used to detect and/or address various treat scenarios.

One example of a threat scenario is IP hopping. In an IP hopping scenario, an attacker may use one or more proxy servers to hide the attacker's true location or machine identity before mounting an attack. Detection of this type of scenario can involve geographic resolution (e.g., identifying or looking up a geographic location associated with an IP address) of each IP connection used to connect to a cloud application. Detection can further include detecting anomalous characteristics in the spatial data, and predicting a threat from this information. Metrics used for detection can include, for example, a count of the number of unique IP addresses used by a user per day and/or a velocity, which can refer to the time difference between the use of different IP addresses and the/or duration that each IP address used.

Another example of a threat scenario is an unusual geolocation scenario. An unusual geolocation scenario may refer to activities being originated in locations that are unexpected or outside of an established pattern. This scenario may include activities such as, but not limited to, successful logins or file upload/download from unusual geolocations.

Another example of a threat scenario is a brute force attack. An example of a brute force attack is when an attacker's attempts to try many passwords in order to discover a correct password and compromise a user account. Detection may involve evaluating the velocity of failed login attempts and patterns in event activities to predict a brute force attack. In some examples, brute force attacks may have different speeds, such as a slow attack speed or fast attack speed. Metrics for detection can include, for example, an unusually high number of login failures for existing valid accounts and/or an unusually high number of login attempts with invalid or terminal/suspended usernames.

Another example of a threat scenario is an insider threat. Insider threats can refer to security breaches perpetrated by a person from within a network. For example, an employee of an organization, who has been authorized, through the course of employment with the organization, may misuse the authorization and intentionally or unintentionally case a security breach. Detection of an insider threat can involve tracking a user's normal behavior and generating alerts when events or activities associated with the user's account or accounts deviate from the norm. Metrics can include, for example, an usually high use of corporate resources such as a high number of downloads and/or an employee with a low rating downloading or sharing an unusually high number of files/folders, deleting code from a source code control system, or downloading, deleting, or modifying customer information, among other things.

Another example of a threat scenario is application misuse. Application misuse is a scenario that can include events associated with a terminated or suspending employee (e.g., use of an expired or revoked user account, use cryptographic keys such as an SSH key, etc.) or a malware-infected device performing an unusual number of file downloads/uploads using valid credentials, but an unusual geolocation or IP address, for example.

While specific threat scenarios and types of information that can be used to discern these scenarios are discussed above, one skilled in the art would recognize that threat detection and prediction may utilize any of a variety of information and formulas.

In various examples, the analytics engine 300 can detect the threat scenarios discussed above, as well as other threat scenarios, by examining various external and internal data sources. External data sources can provide activity data 310 obtained from cloud service providers. In some examples, external data can optionally include tenant base lines 317 and third-party data 318. In some examples internal data sources can include data models determined by a behavioral analytics engine 304 and can optionally include threat intelligence data 314 maintained by the security management and control system.

In various examples, cloud services can store user activities as user use the cloud services. For example, a cloud service can store each occurrence of a user logging in to use the service, the actions the user performs while using the service, the resources affected by the actions, data that is moved into, out of, or within the service, and/or the user logging out at the end of a session, among other things. In these and other examples can store the user's activities in a log file, which is referred to herein as an activity log. An entry in an activity log can include, for example, an action performed or a description of an action performed, identification of a user who performed the action, a resource affected by the action, the time at which the action was performed or what time the action was initiated and/or completed, and/or a network location or geolocation for the user who performed the action, among other information. In the example of FIG. 3, the activity data 310 can include activity logs for multiple services and/or multiple service providers. In these and other examples, one activity log can include user activity for one service or for multiple services provided by the same service provider.

In various examples, the analytics engine 300 receives updated activity data 310 once per day, every other day, or periodically over another time interval. In some examples, the analytics engine 300 receives activity data 310 when certain events occur, such as a service indicating that an event has occurred (e.g., the service has been updated or the service has detected a network threat or another event originating at the service), the organization indicating that an event has occurred (e.g., the organization having added users to the service or a network administrator requesting an updated analysis or another event originating at the organization), or the security management and control system indicating that an event has occurred (e.g., receipt of new threat intelligence data 314 or another event originating at the security management and control system.

In some examples, activity logs from different cloud services may have different formats. For example, entries in one activity log may be provided as comma-separated values, while another activity log may use JSON syntax. In these and other examples, the data in the activity logs may be normalized by the analytics engine 300 or prior to being provided to the analytics engine 300. Normalizing the activity data 310 include reformatting the activity data 310 such data from different services and/or service providers is comparable, has the same meaning, and/or bears the same significance and relevance. After normalization, the behavioral analytics engine 304 can aggregate and compare data from different cloud services in meaningful ways. For example, a series of failed login attempts by one user with one cloud service may be deemed not to be a threat. However, a series of failed logins by the same user but at multiple different cloud services indicate a concerted effort to crack the user's password and should thus set off an alarm.

In various examples, the activity data 310 can be ingested in the analytics engine 300 by a behavioral analytics engine 304. In various implementations, the behavioral analytics engine 304 can collect statistics from the activity data 310 and identify behavioral characteristics from the activity data 310. Statistics can include, for example, counts of actions, such as successful login attempts or failed login attempts. In some examples, statistics can be associated with a particular service provider, a particular service, a particular user, a particular action that can be performed in using a service, a particular time frame, other factors, and/or a combination of factors.

In various implementations, the behavioral analytics engine 304 can use statistical data generated from the activity data 310 to determine activity profiles, which are also referred to herein as behavioral profiles. For example, the behavioral analytics engine 304 can generate an activity profile that describes the common or typical usage pattern of a service by the users of a particular organization. As another example, the behavioral analytics engine 304 can generate an activity profile for a particular user or group of users. In this example, the activity profile can describe a user's activity in using one service or multiple services. In various examples, to identify a user's activity across services, the behavioral analytics engine 304 can have access to user identity data, which can link together a particular user's accounts with different cloud services. the user identity data can include, for example, the user's username or other form of identification with each cloud service. In various examples, the user identity data can be provided by an organization. Alternatively or additionally, in some examples, the security management and control system can automatically determine that different user accounts are related. For example, the security management and control system can assume that user accounts with the same user name or originating with the same IP address or MAC address should be linked.

In some examples, the behavioral analytics engine 304 can include contextual data in the activity profile for a user. Contextual data can be obtained, for example, from third-party data 318, where the source of the third-party data 318 is a reputation system, a social media system, a news aggregator or provider, or another system that can maintain information about a user. Examples of contextual data include, travel location and itinerary from travel applications or email, employee status from healthcare management systems, sensitive financial time period from a Salesforce application, and/or sensitive emails from email servers, among other data. In some examples, contextual data can additionally or alternatively be obtained from client devices used by the user. In these examples the contextual data can include, for example, identification of a type of the client device, IP addresses used by the client device, geolocation data computed by a Global Positioning System (GPS) receiver of the client device, and other information about the client device or that can be obtained from the client device.

In various examples, activity profiles can cover different time periods. In some examples, activity profiles can use a fixed moving window covering a time period measured in weeks. In some examples, an "emerging profile" can be generated, which capture events that are relatively recent, such as within the last week or within a week prior to a target date. In some examples, a "stable profile" can be generated, which includes events within the last four (or eight) weeks or within four (or eight) weeks prior to a target date. In various examples, other profiles or profile types can be generated.

In some examples, fixed moving windows can be non-overlapping. That is, a window that goes further back in time can exclude events in a window that is more recent in time. For example, an eight week profile does not include events in a four week profile or one week profile and similarly the four week profile does not include events within the one week profile. Daily (or periodic) aggregation processes may be run intra-day or inter-day.

Table 3 below shows example calculated statistics for some user activities. The example user activities include an average login count for a four week window profile ("avglogcntday4wk"), an average login IP address count for a four week window profile ("avglogipcntday42k"), a standard deviation of login count for a one week window profile ("stdlogcntday 1wk"), and a standard deviation of login IP address count for a one week window profile ("stdlogipcntday1wk"). Similar and other statistics can be calculated, depending on the available data and/or the threat being predicted.

TABLE 3

| User ID | avglogcntday_4wk | avglogipcntday_4wk | stdlogcntday_1wk | stdlogipcntday_1wk |
|---|---|---|---|---|
| User 1 | 5 | 4 | 3 | 2 |
| User 2 | 6 | 2 | 2 | 1 |
| User 3 | 4 | 3 | 2 | 2 |
| User 4 | 4 | 4 | 2 | 1 |
| User 5 | 5 | 5 | 1 | 1 |

Statistics such as those illustrated above can be combined into a feature vector. Feature vectors can include, for example, a count of a number of logins, a count of a number of distinct IP addresses used for logging in, a maximum distance between any two IP addresses used to log in within a 24-hour time period, a count of a number of distinct browsers used in connections to the cloud application within a 24 hour time period, and/or other measures. Feature vectors may be aggregated per cloud application and/or per user per cloud application.

Table 4 below shows example daily aggregation matrix vectors. The first column provides example application providers, the second column illustrates vector dimensions that may be supported by the providers, and the third column illustrates values that can be assigned to each dimension.

TABLE 4

| Application | Dimension | Description |
|---|---|---|
| Amazon, Salesforce, Box | Login | (# of count, Avg, Stddev, Max) |
| Amazon, Salesforce, Box | Failed Login | (# of count, Avg, Stddev, Max) |
| Amazon, Salesforce, Box | Login IP | (# of count, Avg, Stddev, Max) |
| Amazon, Salesforce, Box | Failed Login IP | (# of count, Avg, Stddev, Max) |
| Box | Download | (# of count, Avg, Stddev, Max) |
| Box | Download IP | (# of count, Avg, Stddev, Max) |
| Salesforce | Browsers | (# of count, Avg, Stddev, Max) |
| Salesforce | Mass Delete, Mass Transfer, Data Export | (# of count, Avg, Stddev, Max) |
| Salesforce | Certificate and Key Management | (# of count, Avg, Stddev, Max) |
| Salesforce | Network Access and IP Whitelist Changes | (# of count, Avg, Stddev, Max) |
| Salesforce | Manage User Changes | (# of count, Avg, Stddev, Max) |
| Salesforce | Platforms | (# of count, Avg, Stddev, Max) |
| Salesforce | Password Policy Changes | (# of count, Avg, Stddev, Max) |
| Salesforce | Shared Setting Changes | (# of count, Avg, Stddev, Max) |
| Amazon | EC2 Instance Changes | (# of count, Avg, Stddev, Max) |
| Amazon | Security Group Changes | (# of count, Avg, Stddev, Max) |
| Amazon | SSH Key Pair Changes | (# of count, Avg, Stddev, Max) |
| Amazon | Network ACL Changes | (# of count, Avg, Stddev, Max) |
| Amazon | VPN Connection Changes | (# of count, Avg, Stddev, Max) |
| Amazon | SAML Changes | (# of count, Avg, Stddev, Max) |
| Amazon | VPC Changes | (# of count, Avg, Stddev, Max) |
| Amazon | IAM Access Key Changes | (# of count, Avg, Stddev, Max) |

Table 5 below lists example values for several possible daily aggregation matrix vectors. The example vectors illustrated here include a count of logins per day for one day ("logcntday_1dy"), a count of failed logins per day for one day ("logfailcntday_1dy"), a count per day of IP addresses from which failed logins occurred over one day ("logfailipdisday_1dy"), and a count per day of IP addresses used to log in over one day ("logipdisday_1dy").

TABLE 5

| User ID | logcntday_1dy | logfailcntday_1dy | logfailipdisday_1dy | logipdisday_1dy |
|---|---|---|---|---|
| User1 | 5 | 4 | 3 | 2 |
| User2 | 6 | 2 | 2 | 1 |
| User3 | 4 | 3 | 2 | 2 |
| User4 | 4 | 4 | 2 | 1 |
| User5 | 5 | 5 | 1 | 1 |

In various examples, activity profiles determined by the behavioral analytics engine 304 can be used by the threat detection engine 302 to identify usage of a cloud service that may pose a threat to an organization that is using the cloud service. In some examples, the threat detection engine 302 applies security policies to identify a threat. A security policy can describe an event that, when the event occurs, the event is brought to the attention of the organization and/or the security management and control system. For example, security policies can specify actions, such as downloading a file containing credit card numbers, copying encryption keys, elevating privileges of a normal user, and so on, that need to be brought to the attention of the organization. In some examples, a security policy can also describe an action that is to be taken when an event is detected, such as blocking access to a service, or disabling a user account.

In some examples, the threat detection engine 302 conducts anomaly detection to identify a threat. Anomaly detection can involve searching for statistical variations from an established norm. In some examples, the operations of the threat detection engine 302 can be augmented by a tenant base line 317, which can include threat intelligence from the organization. In some examples, the threat detection engine 302 can alternatively or additionally receive threat intelligence data 314 that is maintained by the security management and control system, and/or third-party data 318 that includes threat intelligence from, for example, threat intelligence aggregators or distributors.

Provided below are various example algorithms that can be used for anomaly detection. These algorithms are provided as examples, and other algorithms can be used.

Algorithm 1 is one example of an algorithm that can be used to determine login IP address variations. Z-scores can be calculated for a login IP address feature vector over different time periods. The example that follows uses one week, four weeks, and eight weeks as examples of time different time periods, resulting in three Z-scores:

$$L1\ ZScore = \frac{\text{Login IP past 24 hrs} - 1\ \text{wk Avg Login IP}}{1\ \text{Wk Stddev Login IP}}$$

$$L2\ ZScore = \frac{\text{Login IP past 24 hrs} - 4\ \text{wk Avg Login IP}}{4\ \text{Wk Stddev Login IP}}$$

$$L3\ ZScore = \frac{\text{Login IP past 24 hrs} - 8\ \text{wk Avg Login IP}}{8\ \text{Wk Stddev Login IP}}$$

The Z-scores may be combined with weights (w1 ... w3) assigned to each score, as follows:

$$L\ \text{Combined} = (w1 \times L1\ ZScore) + (w2 \times L2\ ZScore) + (w3 \times L3\ ZScore)$$

In some examples, the sum of the weights is one. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weights can be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 2 is an example of an algorithm that can be used to detect failed login IP address variations. Z-Scores may be calculated for a login IP address feature vector over different time periods, here illustrated as one week, four weeks, and eight weeks, as an example:

$$L1\ ZScore = \frac{\text{Failed Login IP past 24 hrs} - 1\ \text{wk Avg Failed Login IP}}{1\ \text{Wk Stddev Failed Login IP}}$$

$$L2\ ZScore = \frac{\text{Failed Login IP past 24 hrs} - 4\ \text{wk Avg Failed Login IP}}{4\ \text{Wk Stddev Failed Login IP}}$$

$$L3\ ZScore = \frac{\text{Failed Login IP past 24 hrs} - 8\ \text{wk Avg Failed Login IP}}{8\ \text{Wk Stddev Failed Login IP}}$$

The Z-scores for the failed login IP addresses may be combined with weights (w1 ... w3) assigned to each score, as follows:

$$L\ \text{Combined} = (w1 \times L1\ ZScore) + (w2 \times L2\ ZScore) + (w3 \times L3\ ZScore)$$

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as the weeks progress, as provided in the example of Algorithm 1. An anomaly condition in the variation in login IP addresses may be defined as L_Combined>T where T is a threshold. The threshold can be determined from previous data and/or can be modified over time.

In various examples, anomalous activity that is detected for a user of one cloud service can be used by the threat detection engine 302 to calculate or re-calculate the likelihood of a threat in the use of another cloud service. In this way, new events occurring during the use of one cloud service can be screened proactively to detect and/or predict threats in the use of another cloud service. In various examples, multiple data points across different cloud services can be correlated to increase the accuracy of a threat score.

Algorithm 3 provides an example of an algorithm that can be used for analytics of multiple application behavior. In algorithm 3, user IP addresses associated with various cloud service activities (such as logging in) are resolved to geo-location coordinates IP1 (Latitude 1, Longitude 1), IP2 (Latitude 2, Longitude 2), IP3 (Latitude 3, Longitude 3), etc. If a user has different usernames with different cloud services, the various usernames associated with that user can be mapped to a unique user specific identity that identifies the user across the services. The distance between any two IP addresses used for logins (e.g., login attempts, successful logins, and/or failed logins) with any of a number of cloud service (e.g., Amazon Web Services, Box, Salesforce, etc.) can be calculated using any of a variety of distance measurements and/or formulas. In some examples, the distance d is calculated using the Haversine Distance formula, as follows:

$$Diff_{Long} = Longitude2 - Longitude1$$

$$Diff_{Latitude} = Latitude2 - Latitude1$$

$$a = \left(\sin\left(\frac{Diff_{Latitude}}{2}\right)\right)^2 + (\cos(Latitude1) \times \cos(Latitude2) \times \left(\sin\left(\frac{Diff_{Long}}{2}\right)\right)^2$$

$$c = 2 \times \mathrm{atan2}(\sqrt{a}, \sqrt{1-a})$$

$$d = R \times c$$

In the equation for d, R is the radius of the Earth.

Z-Scores can be calculated to determine deviation of user behavior over different time periods using maximum distances as calculated above. As an example, time periods of 1 week, 4 weeks, and 8 weeks are shown:

$$L1\ ZScore = \frac{\text{Max dist IP Login past 24 hrs} - \text{1 wk Avg (Max dist IP Login per day)}}{\text{1 Wk Stddev (Max dist between IP Login IP per day)}}$$

$$L2\ ZScore = \frac{\text{Max dist IP Login past 24 hrs} - \text{4 wk Avg (Max dist IP Login per day)}}{\text{4 Wk Stddev (Max dist between IP Login IP per day)}}$$

$$L3\ ZScore = \frac{\text{Max dist IP Login past 24 hrs} - \text{8 wk Avg (Max dist IP Login per day)}}{\text{8 Wk Stddev (Max dist between IP Login IP per day)}}$$

The Z-scores may be combined with weights (w1 ... w3) assigned to each score, as follows:

$$L\ \text{Combined} = (w1 \times L1\ ZScore) + (w2 \times L2\ ZScore) + (w3 \times L3\ ZScore)$$

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as time progresses, as provided above. An anomaly condition in the variation in login IP addresses may be defined as L_Combined>T where T is a threshold. The threshold can be determined from previous data and/or can be modified over time.

Algorithm 4 provides an example of an algorithm for determining variations in the browser or operating system (OS) used when a cloud application is accessed. Z-Scores may be calculated using a feature vector that represents a count of the number of different browsers or operating systems used when accessing a cloud application, where the accesses occurred over various time periods. Periods of one week, four weeks, and eight weeks are used below, as an example:

$$L1\ ZScore = \frac{\{\text{Browser, OS}\}\text{counts past 24 hrs} - \text{1 Wk Avg (\{Browser, OS\}counts per day)}}{\text{1 Wk Stddev (\{Browser, OS\}counts per day)}}$$

$$L2\ ZScore = \frac{\{\text{Browser, OS}\}\text{counts past 24 hrs} - \text{4 Wk Avg (\{Browser, OS\}counts per day)}}{\text{4 Wk Stddev (\{Browser, OS\}counts per day)}}$$

$$L3\ ZScore = \frac{\{\text{Browser, OS}\}\text{counts past 24 hrs} - \text{8 Wk Avg (\{Browser, OS\}counts per day)}}{\text{8 Wk Stddev (\{Browser, OS\}counts per day)}}$$

The Z-scores may be combined with weights (w1 ... w3) assigned to each score, as follows:

$$L\ \text{Combined} = (w1 \times L1\ ZScore) + (w2 \times L2\ ZScore) + (w3 \times L3\ ZScore)$$

In various examples, default baselines can be initially applied, and as time progresses, the weights can be varied as more data becomes available. An anomaly condition in the variation in login IP addresses may be defined as L_Combined>T where T is a threshold. The threshold can be determined from previous data and/or can be modified over time.

Algorithm 5 provides an example of an algorithm for determining variations in the number of downloads from a cloud application. Z-Scores may be calculated using a feature vector representing a count of the number of downloads for a user account over various time periods, such as one week, four weeks, and eight weeks, as provided in the following example:

$$L1\ ZScore = \frac{\text{Downloads counts past 24 hrs} - \text{1 Wk Avg (Download ounts per day)}}{\text{1 Wk Stddev (Download counts per day)}}$$

$$L2\ ZScore = \frac{\text{Downloads counts past 24 hrs} - \text{4 Wk Avg (Download ounts per day)}}{\text{4 Wk Stddev (Download counts per day)}}$$

$$L3\ ZScore = \frac{\text{Downloads counts past 24 hrs} - \text{8 Wk Avg (Download ounts per day)}}{\text{8 Wk Stddev (Download counts per day)}}$$

The Z-scores may be combined with weights (w1 ... w3) assigned to each score, as follows:

$$L\ \text{Combined} = (w1 \times L1\ ZScore) + (w2 \times L2\ ZScore) + (w3 \times L3\ ZScore)$$

In various examples, default baselines can be initially applied, and as time progresses, the weights can be varied as more data becomes available. An anomaly condition in the variation in login IP addresses may be defined as L_Combined>T where T is a threshold. The threshold can be determined from previous data and/or can be modified over time.

In various examples, scores such as those illustrated above, as well as other indicators, can be used to compute a risk score, which is also referred to herein as a measure of security. In various examples, the threat detection engine 302 can compute a risk score for a user, a group or category of users, a service, and/or a service provider. A risk score can indicate a degree of security risk. For example, a scale from one to five can be defined, where a higher value indicates that a user or a service poses a higher security risk for an organization.

Indicators used to compute a risk score can provide a particular risk factor, also in the form of a score. For example, an outcome of anomaly detection can include an indicator in the form of a score that indicates a degree of deviation from the norm and/or a degree of risk the anomaly poses to the organization. In some examples, each anomaly associated with the same user or the same service can be used as a separate indicator. In various examples, other indicators that can be used to compute a risk score can be associated with a user, a service, a service provider, a geolocation where the user appears to be located, a domain where the user appears to be located, a time of day or day of the week or time of the year, or another factor. An indicator for a user can be obtained, for example, from the organization with which the user is associated, from a reputation site, from social media sites, from news organizations, or from another source. An indicator for a service or service provider can be obtained, for example, from threat intelligence aggregators or distributors, who may track the reputation of a service or service provider. Other indicators may be provided by internal threat intelligence data 314.

In various examples, a risk score can be computed as a weighted sum of the available indicators. For example, given indicators "$I_1, I_2, \ldots, I_n$" a risk score can be computed using the equation:

$$\text{risk score} = \frac{I_1 W_1 + I_2 W_s + \cdots + I_n W_n}{W_1 + W_2 + \cdots + W_n}$$

In the preceding equation, "$W_1, W_2, \ldots W_n$" are weights. In various examples, a weight value can indicate the relative importance of an indicator, with less important indicators receiving a lower weight value.

In some examples, the analytics engine 300 may obtain feedback on the validity and/or accuracy of a risk score. As an example, network administrators of an organization can provide feedback. As another example, adminsitrators of the security management and control system can provide feedback. Alternatively or additionally, in some examples, feedback can be obtained using autoamated machine learning algorithms, such as decision trees and neural networks. In some examples, the analytics engine 300 can adjust weights, indicators, and/or sources using the feedback, including possibly removing sources or indicators. In these and other examples, the threat detection engine 302 can compute a new risk score with the adjusted indicators and weights.

In various examples, the threat detection engine 302 can perform regression analysis on each indicator used to compute a risk score, and/or on the risk score. Regression analysis may include building and updating a linear regression model. A linear regression model may provide output such as $S=c_1(I_1)+c_2(I_2)+ \ldots +c_n(I_n)$. The coefficients $c_i$ computed by the regression model could be new or modified weights that would replace the initial weights for computing the risk score. The model can provide greater accuracy as more feedback and more data is collected.

In various examples, the analytics engine 300 can perform various other analytics 306 on the activity data 310 obtained from service providers. In some examples, various types of algorithms can be particularly useful for analyzing the data. Decision tree, time series, naive Bayes analysis, and techniques used to build user behavior profiles are examples of machine learning techniques that can be used to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity with one cloud application or across multiple cloud applications, possibly over time.

One class of analytics that may be generated is descriptive or statistical analytics. Statistical data can be generated using a pre-defined set of system queries, such as, for example, MapReduce jobs and Spark and Apache Hive queries, among others. Descriptive analytics can be generated either for a single service or across multiple services using correlation techniques. Examples of reports that can be generated include, for example, login statistics (e.g., users with the most failed logins, IP address-based login history including consideration of IP reputation, geolocation, and other factors), user statistics (e.g., users with the most resources [files, EC2 machines, etc.], entitlements across clouds, number of changed passwords, and so on), activity statistics (e.g., activity of a user across clouds), statistics on key rotation (e.g., whether Secure Shell (SSH) keys have been rotated within the last thirty days, and so on), and resource statistics (e.g., number of folders, files downloaded by users, files downloaded by roaming or mobile users, and so on), among others. Various statistical analysis techniques can be used, such as mean, standard deviation, regression, sample size determination, and hypothesis testing, among others. Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, for example, deviations from base line expectations, rare and infrequent events, and behavior analytics to derive suspicious behavior of a user, among others. Algorithms and profiles can be trained to intelligently predict whether an unusual behavior is a security risk. Third-party feeds from providers such as, but not limited to, MaxMind, FireEye, Qualys, Mandiant, AlienVault, and Norse STIX can be integrated to augment the threat intelligence. These third-party feeds can provide external information about and relating to potential security threats such as, for example, IP address reputation, malware, identification of infected node points, vulnerable web browser versions, use of proxy or Virtual Private Network (VPN) server by a user, and known attacks on clouds. In some examples, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file accesses, sales transactions, or instances of virtual machines.

Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In some examples, data collected over time is used to build models of normal behavior (e.g., patterns of events and activity) and flag behavior that deviates from normal as abnormal behavior. After one or more flagged events or activities is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over a period of time can be used with machine learning algorithms to generate patterns referred to as user behavior profiles. The activity data can include contextual information such as IP address and geographic location.

In various implementations, an algorithm can simulate normal user activities using previously acquired user activity data. For example, the tenant base lines 317 can include records of users' past use of a cloud service. The simulation can be used to train other machine learning algorithms to learn the normal behavior of an organization's users. In general, a particular security issue may not always repeat, and hence may not be detected by a purely supervised algorithm. However, techniques such as outlier detection can establish a baseline that is useful for detecting anomalous activities. Such anomalous activities along with contextual threat intelligence can provide more accurate prediction of threats with low prediction errors.

In various implementations, the other analytics 306 can include detection of security controls drift, which can refer to the changing of one or more security controls in a seemingly arbitrary manner, which can increase security risks. In some examples, a risk event can be generated in response to the change in a security control of a cloud service, as well as actionable intelligence associated with the risk event. Threats can include activity, events, or security controls that are abnormal or noncompliant with respect to use of an application. As an example, a tenant's password policy in a cloud application may have been changed to impose fewer requirements (e.g., type and/or number of characters). This may generate a risk event and alert to recommend that the password policy be changed back to the original password policy.

In various implementations, the analytics engine 300 can include a recommendation engine 308 that receives the output of the threat detection engine 302, the behavioral analytics engine 304, and the other analytics 306. In various examples, the recommendation engine 308 can raise alerts 322, make recommendations 324, automatically perform actions 326, and provide visualizations 328 that an organization can use to understand the organization's use of a cloud service, detected security risks, and remediation of the security risks, among other things.

In various examples, alerts 322 can be provided in visualizations 328 that can be viewed using a user interface that is accessible to an organization. Alternatively or additionally, alerts 322 can be provided through other communication channels, such as email, text messages, Short Message Service (SMS) messages, voicemail, or another communication method. In some examples, alerts 322 can be communicated as secure messages (e.g., over a secure communication channel or requiring a key or login credentials to view).

An alert can include information about a detected event such as, for example, an event identifier, a date, a time, a risk level, an event category, a user account and/or security controls associated with the event, a service associated with the event, a description of the event, a remediation type (e.g., manual or automatic), and/or an event status (e.g., open, closed) among other information. Information in an alert about each risk event can include, for example, an identifier for the affected cloud service or instance a category, a priority, a date and time, a description, a recommended remediation type, and/or a status, among other information. A risk event may also have a user-selectable action, such as editing, deleting, marking status complete, and/or performing a remediation action. Selection of a remediation action may invoke an application such as the incident remediation application and/or cloud seeder application to perform the selected remediation. An alert and/or other information concerning an identified threat can be sent to an entity external to security monitoring and control system.

In some examples, counts of events in different event categories over time can be provided as a graphical visualization, such as a chart. The chart may display, for example, a count of events by date in each of the color coded categories such as activities at an unusual time, after-hours downloads, failed logins, etc. The visual representation (e.g., a line) of an event category can be toggled on and off. In some examples, threats can also be displayed in a summary view.

In some examples, when the network administrators of an organization receive alerts 322, the network administrators may take remediation actions from within the organization's network. In these examples, the security management and control system may maintain an alert in an "open" state until the network administrators repot that the alert can be closed.

In various examples, the recommendation engine 308 can also determine recommendations 324 when the threat detection engine 302 or the other analytics 306 flag an event that requires attention. A recommendation can include, actions that can be taken to further investigate a suspicious event or to remediate (e.g., take corrective actions against) a suspicious event. In various examples, recommendations 324 can be presented to network administrators of an organization in visualizations 328, presented in a user interface. Alternatively or additionally, the recommendations 324 can be presented through other forms of communication, such as email, text messages, Short Message Service (SMS) messages, voicemails, and so on. In various examples, the network administrators of the organization can choose to activate a recommended action, which can cause the security management and control system to perform the actions.

In various examples, the recommendation engine 308 can use association rule learning can to generate recommendations. In some examples, the recommendation engine 308 can use profile linking algorithms to link activities across multiple cloud applications by finding cross-service correlation. A single user can be identified across multiple cloud service using one or more attributes or identification factors, such as a primary user identifier that is commonly used across the clouds or a single sign-on (SSO) authentication mechanism (e.g., Active Directory, Okta, etc.). Examples of correlation of activities across applications find a user logged into two cloud services simultaneously from different IP addresses, find a user who performs several failed login attempts and subsequently changes the user's password, and users who frequently have with numerous failed logins for two or more cloud services, among other examples.

In various examples, the recommendation engine 308 can also determine actions 326, including remediation actions, which the security management and control system will automatically perform. In various examples, the organization can configure to automatically perform remediation actions when the analytics engine 300 detects certain security events. Examples of remediation actions include deactivating an account, resetting a password, or setting stronger security controls, among others. In these and other examples, the remediation actions may include modifying a security setting of a service affected by the security incident, or of another service. In the latter case, the analytics engine 300 may determine that the other service may be affected, or should otherwise be secured when the security incident is detected.

In some examples, an organization may use a third-party incident management automation systems such as, for example, ServiceNow or IBM QRadar, among others. In these examples, the security management and control system may be able to interface with the third-party incident management system to remediate security incidents. For example, the incident management systems may have an API through which the security management and control system can interact with the incident management systems. In this and other examples, an action determined by the recommendation engine 308 can include sending an alert and/or other information about a security incident to an incident management system, which can track and possibly also remediate the incident. The incident management system may return a status to the security management and control system (e.g., complete or not complete). In this way, remediation may be delegated to an external system with the results reported back to the security management and control system to "close the loop." For example, if a password reset is desired for a user account, an action can include sending an alert or message to an organization's internal IT system managing the user account. An administrator or system may complete the password reset operation and report the status as completed back to the cloud security system.

In various examples, a cloud service can define privileges that distinguish an administrative user from an ordinary user of the service. By having greater or more privileges, administrative users can configure and manage the cloud service for an organization, whereas ordinary users can only use the cloud service.

As discussed above, identifying the privileged users of a cloud service may not be straightforward. For example, each cloud service may have a different definition of the privileges that qualify one user as an administrative user while another use is an ordinary user. As another example, the administrative users of a cloud service may change over time, with new administrative users being created in ways and at times that are not controlled by the organization. As another example, knowledge of which user accounts are privileged may be lost as employees of an organization leave or change job duties.

In various implementations, a security management and control system can implement techniques for identifying the privileged users of a cloud service. The activities of the privileged users can then be tracked using methods such as those discussed above, including behavioral analysis, anomaly detection, and machine learning techniques, with a higher degree of scrutiny applied that is commensurate with the greater harm that can be done should a privileged account be misused.

Figure 4:
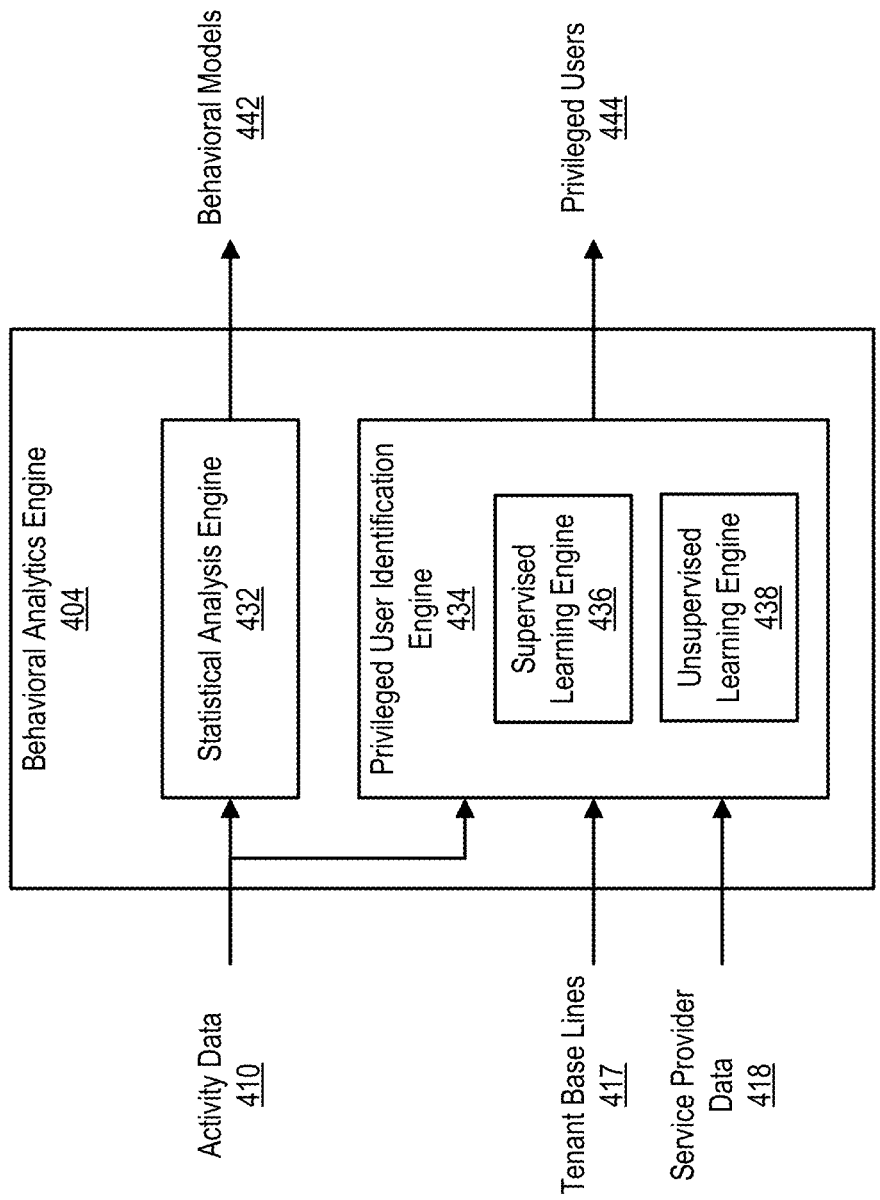
FIG. 4 illustrates a block diagram of a behavioral analytics engine.

In various implementations, identification of privileged users can be a component of a analytics engine of a security management and control system. FIG. 4 illustrates a block diagram of a behavioral analytics engine 404, which is an example of one component of an analytics engine that can implement identification of privileged users. In various examples, the behavioral analytics engine 404 can receive activity data 410 that can include records of user activity for one cloud service or multiple cloud services. The activity data 410 can include, for example, a listing of actions performed, users that performed the action, one or more objects impacted by the action(s), contextual data such as timestamp, and/or network location from where user performed the action, among other things.

In various examples, the behavioral analytics engine 404 can include a statistical analysis engine 432, which can conduct statistical analysis on the activity data 410. In various examples, the statistical analysis engine 432 can output behavioral models 442, which can describe the manner in which the users of an organization use a cloud service or multiple cloud services. For example, the statistical analysis engine 432 can output a model that describes the use of a cloud service by a particular user, the use of a cloud service by a group of users, and/or the use of a cloud service by all the users in an organization. As another example, the statistical analysis engine 432 can output a model that describes the manner in which a cloud service is used by the users of an organization, and/or a model that describes the manner in which multiple cloud services are used by one or more users of an organization. In various examples, the statistical analysis engine 432 can output other models that describes users, users' actions in using a cloud service, and/or the manner in which cloud services are used.

In various examples, the behavioral analytics engine 404 can also include a privileged user identification engine 434, which can produce a list of the privileged users 444 of a cloud service. In various examples, the privileged user identification engine 434 can use different techniques, possibly in combination, to identify the privileged users of a cloud service.

As a first example, the privileged user identification engine 434 can learn the identities of privileged users from tenant base lines 417, which can include a list of user names for users that are administrative users of a cloud service. In various examples, an organization may have a list of the administrative users of a cloud service. For example, when the organization registers for a service such as Salesforce, the organization can specify to Salesforce which users are to be administrative users. In some cases, the organization may change the administrative users for the service, and can provide the security management and control system with an updated list of administrative users. In many cases, however, an organization may not have good processes in place for tracking the administrative users of a cloud service, and thus may not be able to provide accurate lists in the tenant base lines 417.

As a second example, the privileged user identification engine 434 can learn the identities of privileged users from service provider data 418, which is obtained from a service provider. The service provider have an API that can include functions that enable the security management and control system to request a list of privileged users of the service. In various examples, the security management and control system can make this request periodically, in case the privileged users of the service changes. Many cloud services, however, may not provide this functionality. Alternatively or additionally, a cloud service's own definition of a privileged users may be too narrow, and may exclude operations that can affect other users of the service or the operation of the service.

In various implementations, in addition to or instead of relying on the tenant base lines 417 and/or the service provider data 418, the privileged user identification engine 434 can use learning techniques to determine privileged users from the activity data 410 from a cloud service. In these implementations, the privileged user identification engine 434 can include a supervised learning engine 436 and/or an unsupervised learning engine 438.

In various implementations, the supervised learning engine 436 can receive training data from an organization and/or from the operators of the security management and control system. In various examples, the training data can include some or all of the actions that can be performed with a cloud service, and labels for the actions that indicate whether an action is or is not privileged. In some examples, the labels may indicate different categories of privileges. For example, a set of privileges may be administrative privileges while a different set of privileges are co-administrative privileges. In various examples, supervised learning engine 436 can use the training data to train a classification model, such as a neural network or a random forest or another classification model.

In various examples, the supervised learning engine 436 can apply a classification model to the activity data 410 from the service. Generally, the classification model is generated from training data that corresponds to the activity data from the same cloud service (e.g., the training data is developed from actions that can be performed using the cloud service). Using the classification model, the supervised learning engine 436 can, for example, extract events in an activity log that involved privileged actions. Because the activity log can list a user with each event, the supervised learning engine 436 can determine that user who initiated the event is likely a privileged user. In various examples, criteria other than or in addition to the action can be used to determine that an event was perpetrated by a privileged user. For example, the privileged nature of an event can be indicated by the resource affected by the action, the manner in which the action affected the resource, the number of times the action was performed, the time at which the action was performed, in IP address from which the event was initiated, and other criteria.

In various examples, accuracy of the determinations made by the supervised learning engine 436 can be verified and improved on by obtaining feedback from the organization and/or from the operators of the security management and control system. For example, the behavioral analytics engine 404 can output a list of privileged users 444 identified by the supervised learning engine 436, as well as the actions the privileged users performed that identified these users as privileged. A reviewer can indicate to the security management and control system whether the users and/or the actions that identified the users are privileged are correct. This information can be fed back to the supervised learning engine 436, which can update the appropriate classification model.

In various implementations, the unsupervised learning engine 438 can attempt to learn actions that are privileged, and from this learning identify privileged users. The unsupervised learning engine 438 can, for example, parse the events in the activity data 410 and store the components of an event as a feature set. For example, the unsupervised learning engine 438 can represent a feature set using a data structure that has field such as "action," "action type," "userid," "timestamp," "affected resource," and other fields for other components of an event. As a further example, the unsupervised learning engine 438 can aggregate events daily, weekly, or for a different time period, and in this way gather a body of historical event data for a cloud service. In various examples, the unsupervised learning engine 438 can apply various unsupervised learning techniques, such as anomaly detection and neural networks, among others, to the accumulated feature sets.

As an example, K-means clusters can be applied to a feature set to identify clusters in the activity data 410, where the clusters can group together privileged users and ordinary users. In some examples, the unsupervised learning engine 438 can be provided with a list of actions that are privileged, or a list of resources that should only be accessed by privileged users, or some other criteria that the unsupervised learning engine 438 can then use to identify clusters of privileged users. Alternatively or additionally, the unsupervised learning engine 438 can presented to an operator of the security management and control system, who can then identify clusters of privileged users, and from the clusters define a model that describes the characteristics of a privileged user.

Table 6 below illustrates examples of average counts actions performed by a group of users on a daily basis. In this example, the actions include file sharing and create user actions in a file sharing application.

TABLE 6

| User | File Share Event # | Create User Event # |
|---|---|---|
| John | 3 | 0 |
| Mary | 6 | 0 |
| Bill | 2 | 0 |
| Kumar | 4 | 0 |
| Chi | 0 | 0 |
| Jose | 11 | 0 |
| Colin | 9 | 0 |
| Sean | 20 | 1 |
| Mike | 19 | 1 |
| Steve | 17 | 1 |
| Alexi | 18 | 3 |
| Samantha | 20 | 3 |
| Josh | 16 | 2 |
| Jenny | 21 | 2 |

Figure 5:
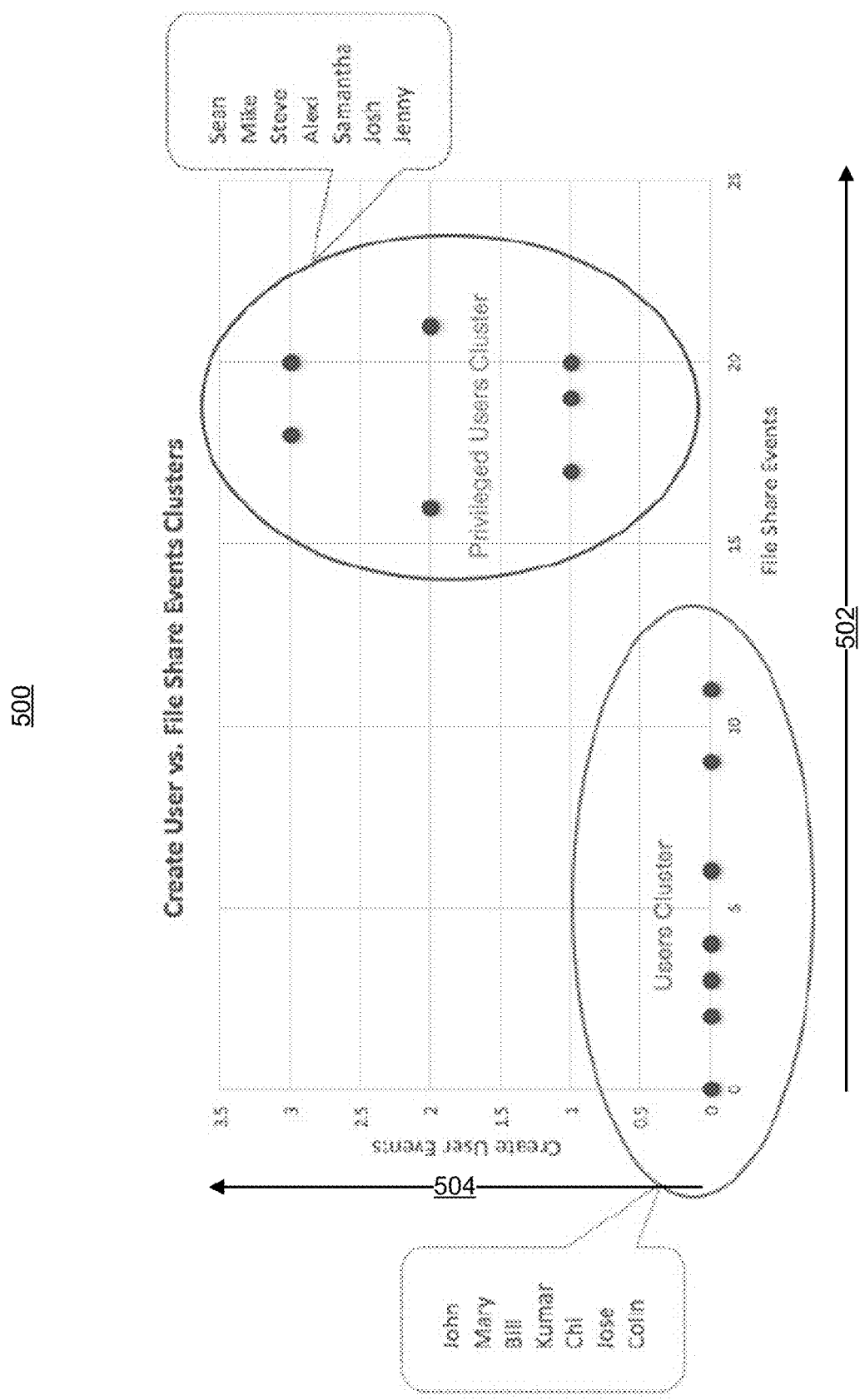
FIG. 5 illustrates an example of a graph of the data in Table 6.

FIG. 5 illustrates an example of a graph 500 of the data in Table 6. The horizontal axis 502 maps the counts of file share events and the vertical axis maps the counts of create user events. According to the data of Table 6, one group of users only executed file share events, and thus the data points for these users all fall along a line at zero create user events. A second group of users conducted both file share events and create user events, thus the data points for these users are greater than zero in both the horizontal and vertical directions.

As illustrated in the example of FIG. 5, two clusters of users are evident. The first cluster, include users Sean, Mike, Steve, Alexi, Samantha, Josh, and Jenny, form one group of users due to have performed the same actions. A second cluster, including users John, Mary, Bill, Kumar, Chi, José, and Colin, for a second by also having performed the same actions. In this example, the users in the first group can be identified as being privileged users due to having performed the create user event. In various examples, identification of the first cluster as a group of privileged users can be determined from a description of activity that is considered privileged, and/or by an operator tasked with analyzing the output of the clustering tool.

In various examples, an action alone may not indicate whether the user who performed the action is a privileged user. For example, in a file sharing service, some file folders may be tagged with a keyword such as "confidential," while others have a different tag or no tag. In this example, some or all events involving the folders that are tagged "confidential" may be privileged events. For example, any user who reads files in a folder tagged "confidential" may be considered a privileged user. As another example, only users who can add new files or delete files in a folder tagged "confidential" may be considered privileged. As a further example, users who only ever access folders with different tags or no tags may be considered ordinary, non-privileged users.

Figure 6:
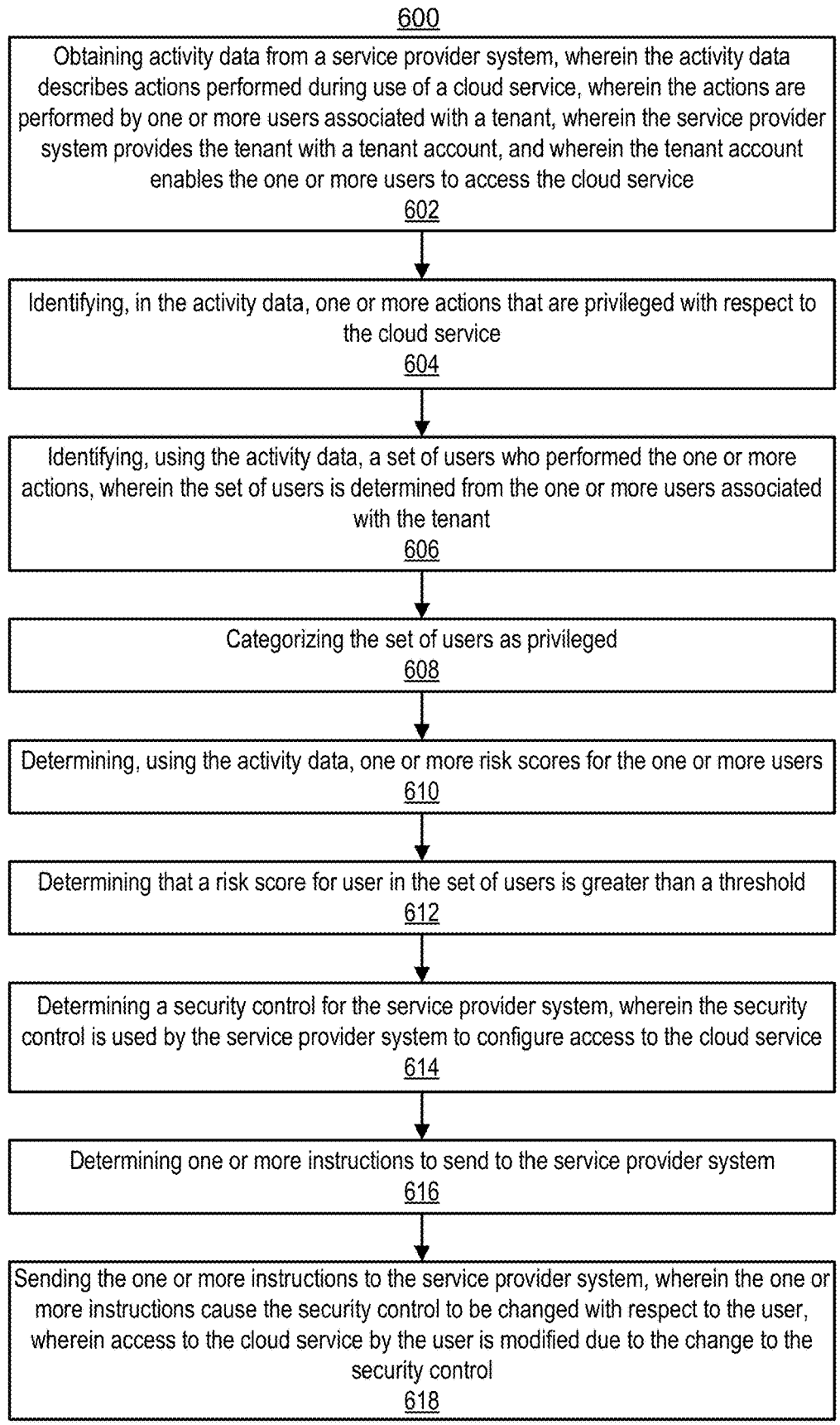
FIG. 6 includes a flowchart that illustrates an example of a process for determining privileged users of a cloud service, and managing security risks that the activity of privileged users may cause.

FIG. 6 includes a flowchart that illustrates an example of a process 600 for determining privileged users of a cloud service, and managing security risks that the activity of privileged users may cause. In various examples, the example process 600 can be performed by a computing system of a security management system. In various examples, the process 600 can be embodied as instructions that are stored on a non-transitory computer readable-medium, which can be executed by the processor or processors of a computing system to perform the steps of the process 600.

At step 602, the process 600 includes obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service. In some examples, a tenant can be an organization that brings together people and resources to serve a common purpose. Examples of organizations include companies, universities, hospitals, government agencies, and other groups of people and resources. In some examples, a tenant can be an individual person using network services. In various examples, an organization or an individual can subscribe to the services of a service provider, and by subscribing gain use of the service provided by the service provider. Examples of cloud services include infrastructure, platforms, networks, and software applications, among others.

In various examples, upon subscribing, a tenant is provided with a tenant account that enables the tenant to access the service. In some examples, users associated with the tenant can be given individual user accounts with the service, which enables each user to use the service. In these and other examples, as the users make use of the service, the service provider can record the actions performed by the users. Actions can include, for example, logging in to the service, logging out, uploading data, downloading data, modifying data, launching executables, and other operations. In various examples, these actions can be recorded in the activity data, along with information such as identification of a user who performed the action, the time at which the action was initiated and/or completed, a resource affected by the action, and/or a network location or geolocation from which the user performed the action, among other information.

At step 604, the process 600 includes identifying, in the activity data, one or more actions that are privileged with respect to the cloud service. Privileged actions are actions that enable a user to affect a resource in a manner that not all users are allowed to perform. For example, a privileged action can be an action that, when executed by a first user, can modify the cloud service in a manner that affects use of the cloud service by other users. As another example, a privileged action can be an action that, when executed by a first user, can affect user accounts of other users of the cloud service.

In some examples, the one or more actions that are privileged can be identified using a list of actions associated with the cloud service, where actions in the list are categorized as privileged with respect to the cloud service. For example, for one cloud service, actions for creating user accounts and deleting user accounts can be categorized as privileged. As another example, for another cloud service, actions for modifying certain file folders can be categorized as privileged.

In some examples, the one or more actions that are privileged can be is identified using a list of administrative actions. In these examples, the list of administrative actions can include actions known to require higher privileges, such as creating or deleting user accounts, modifying access controls or security settings, modifying credentials, and so on.

At step 606, the process 600 includes identifying, using the activity data, a set of users who performed the one or more actions, wherein the set of users is determined from the one or more users associated with the tenant.

In some examples, identifying set of users can include using the one or more actions and past activity data to generate a model. In these examples, the model can describe a pattern of usage of the cloud service that is privileged with respect to the cloud service. For example, supervised or unsupervised learning can be used to train a neural network to recognized an action or a sequence of actions that are privileged with respect to a particular cloud service. In a supervised learning example, the neural network can be provided with labeled training data that identifies actions that are or are not privileged. In an unsupervised learning example, the neural network can be configured to minimize a cost function, where the cost function models changes to cloud service. In these and other examples, the model can be used to identify a set of users.

Alternatively or additionally, identifying the set of users can include grouping the actions performed during used of the cloud service, and identifying a group of actions that includes an action that is privileged. For example, a K-means clustering technique can be used to plot the actions in the activity data, and the users who performed to actions to identify users who performed similar actions. From the plot, groups of users can be identified.

At step 608, the process 600 includes categorizing the set of users as privileged. In various examples, the set of users are privileged due to having performed the one or more actions identified as privileged.

At step 610, the process 600 includes determining, using the activity data, one or more risk scores for the one or more users. In various examples, risk scores indicate a degree of security risk to the tenant from actions performed by a user in using the cloud service. Risk scores can be computed for individual users, groups of uses, individual services, multiple services, services from different service providers, and/or a combination of users and services. In some examples, risk scores are computed as a weight sum of risk indicators. Risk indicators can be associated with an action that was performed, a resource that was affected by the action, particular user, a group of users, a service, a service provider, a network location where the user is located, a network location where the service provider or service is located, a geolocation, a time of day or day of the week or month of the year, another factor, or a combination of factors. Alternatively or additionally, risk indicators can come from threat intelligence obtained from external aggregators and/or distributors of network threat intelligence. In some examples, more important risk indicators are given a higher weight value.

In various examples, risk scores for users categorized as privileged are computed with greater weights than are risk scores for non-privileged users. Thus, for example, when a privileged user performs an action, the risk score for the privileged user may be higher than when a non-privileged users performs the same action. Alternatively or additionally, more or different indicators can be used to determine the risk score for privileged users than for ordinary users. Alternatively or additionally, risk scores for privileged users may be computed more frequently, or otherwise be given a higher degree of scrutiny than the risk scores of non-privileged users.

At step 612, the process 600 includes determining that a risk score for user in the set of users is greater than a threshold. In various examples, the threshold can indicate activity that, when the threshold is exceeded, constitutes a security risk for the tenant. In various examples, the threshold can be associated with a particular tenant, a particular user, a group of users, a particular service or service provider, a time of day or day of the week, another factor, or a combination of factors.

At step 614, the process 600 includes determining a security control for the service provider system, wherein the security control is used by the service provider system to configure access to the cloud service. The security control can depend on factors such as the action or actions performed that caused the risk score to exceed the threshold, the resource affected by the actions, threat intelligence, and/or configuration settings associated with the tenant, among other factors. Examples of security controls that can be determined include blocking a user or group of users from using the service, disabling a particular user account with the cloud service, causing the service to send alerts whenever certain users log in and/or perform certain actions, and blocking data from being uploaded to or downloaded from the service, among other controls.

At step 616, the process 600 includes determining one or more instructions to send to the service provider system. In various examples, the instructions can be determined by querying the service provider to request the appropriate instructions to accomplish a desired configuration. In these examples, a computing system can include automated programs for performing the queries. As another example, the instructions can be determined from an API of the cloud service, where the API can include operations that enable a computing system to modify the configuration of the cloud service.

At step 618, the process 600 includes sending the one or more instructions to the service provider system, wherein the one or more instructions cause the security control to be changed with respect to the user, wherein access to the cloud service by the user is modified due to the change to the security control. In various examples, sending the instructions can include using an authorization assigned to the tenant (e.g., a password, token, or other form of credential), which can enable the security management system to configure the cloud service on behalf of the tenant. In some examples, the instructions are sent to the service provider system for activation by the tenant or the service provider. Once executed, a security risk caused by the privileged user can be monitored, mitigated, and/or stopped.

Figure 7:
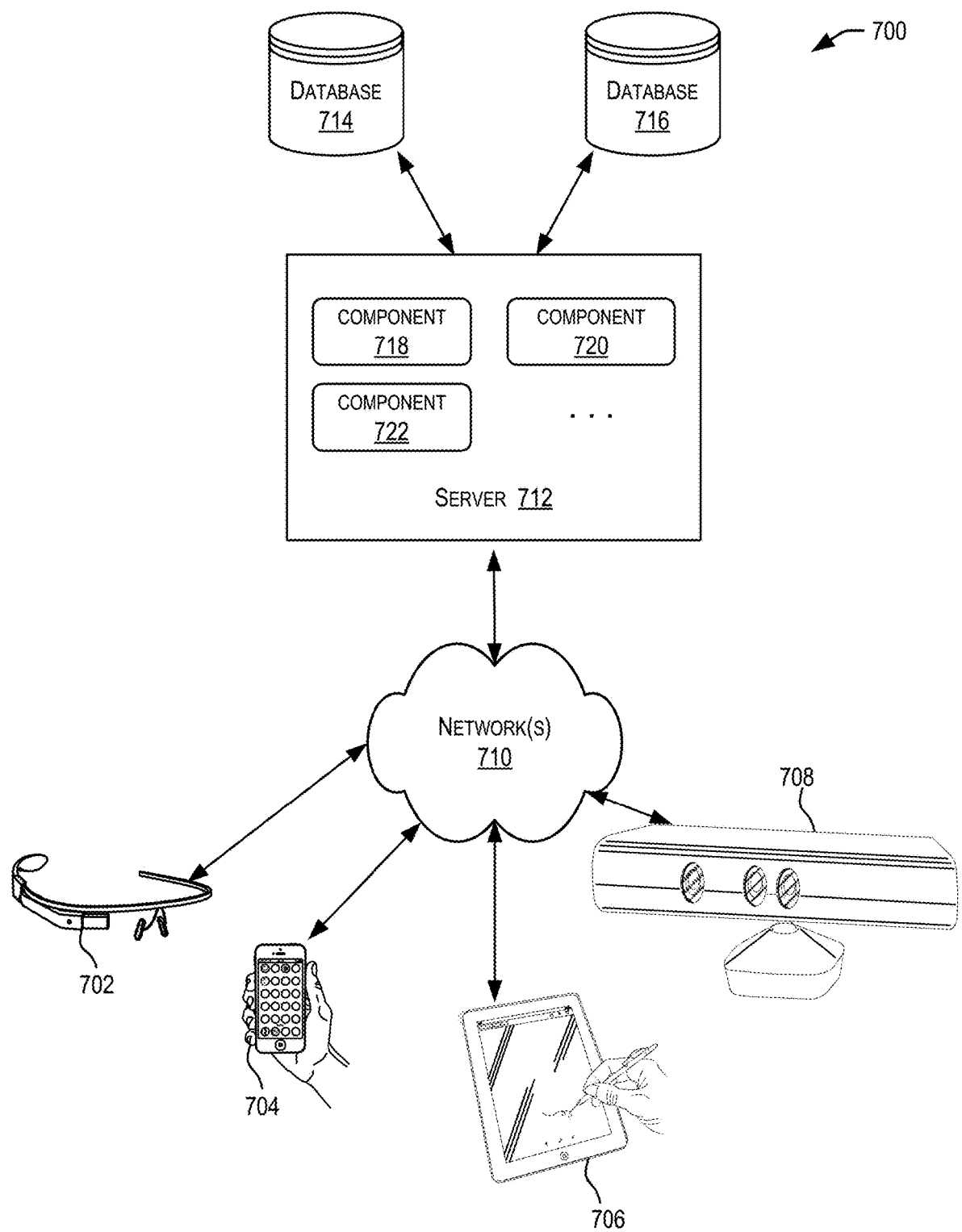
FIG. 7 depicts a simplified diagram of a distributed system in which the various examples discussed above can be implemented.

FIG. 7 depicts a simplified diagram of a distributed system 700 in which the various examples discussed above can be implemented. In the illustrated example, the distributed system 700 includes one or more client computing devices 702, 704, 706, 708, which are configured to execute and operate a client application such as a web browser, proprietary client (e.g., Oracle Forms), or the like over one or more network(s) 710. A server 712 may be communicatively coupled with remote of the client computing devices 702, 704, 706, 708 via the network 710.

In various examples, the server 712 may be adapted to run one or more services or software applications. In some examples, the server 712 may also provide other services or software application, and can include non-virtual and virtual environments. In some examples, these services may be offered as web-based or cloud services or under a Software as a Service (SaaS) model to the users of the client computing devices 702, 704, 706, 708. Users operating the client computing devices 702, 704, 706, 708 may in turn use one or more client applications to interact with the server 712 to use the services provided by these components.

In the configuration depicted in FIG. 7, software components 718, 720, 722 of the system 700 are shown as being implemented on the server 712. In other examples, one or more of the components of the system 700 and/or the services provided by these components may also be implemented by one or more of the client computing devices 702, 704, 706, 708. Users operating the client computing devices may then use one or more client applications to use the services provided by these components. These components may be implemented in hardware, firmware, software, or combinations thereof. It should be appreciated that various different system configurations are possible, which may be different from the example distributed system 700. The example shown in FIG. 7 is thus one example of a distributed system for implementing any system and is not intended to be limiting.

The client computing devices 702, 704, 706, 708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although the distributed system 700 illustrated in FIG. 7 is shown with four client computing devices, any number of client computing devices may be supported. Other devices, such as devices with sensors, etc., may interact with the server 712.

Network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various examples, the server 712 may be adapted to run one or more services or software applications described in the foregoing disclosure. For example, the server 712 may correspond to a server for performing processing as described above.

The server 712 may run an operating system including any of those discussed above, as well as any commercially available server operating system. The server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, 708.

The distributed system 700 may also include one or more databases 714, 716. These databases may provide a mechanism for storing information such as user interaction information, usage patterns information, adaptation rules information, and other information used by the various examples discussed above. The databases 714, 716 may reside in a variety of locations. By way of example, one or more of the databases 714, 716 may reside on a non-transitory storage medium local to (and/or resident in) the server 712. Alternatively, the databases 714, 716 may be remote from the server 712 and in communication with the server 712 via a network-based or dedicated connection. In some examples, the databases 714, 716 may reside in a storage-area network (SAN). Similarly, any necessary files for performing the functions attributed to the server 712 may be stored locally on the server 712 and/or remotely, as appropriate. In some examples, the databases 714, 716 may include relational databases, such as databases provided by Oracle that are adapted to store, update, and retrieve data in response to SQL-formatted commands.

Figure 8:
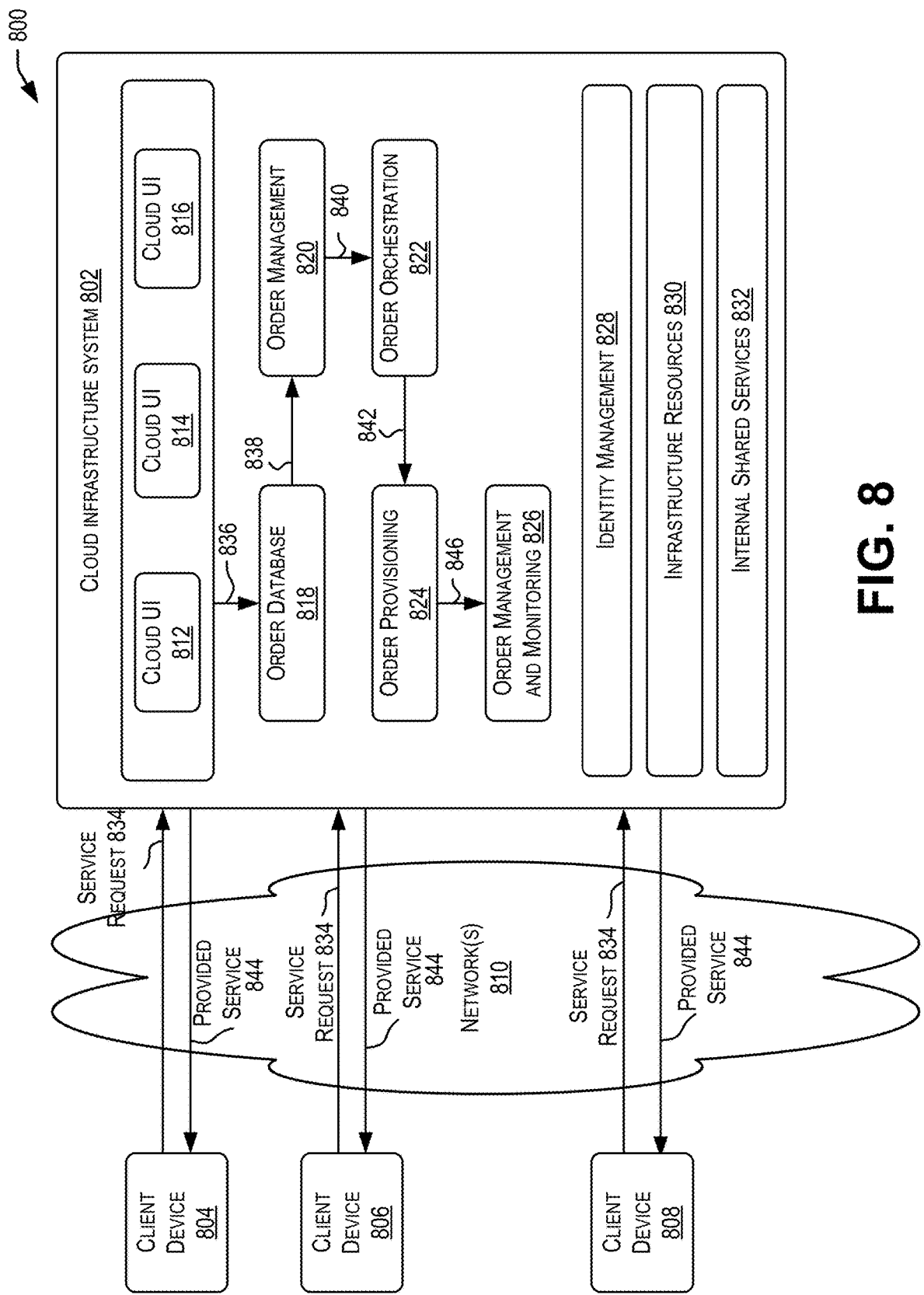
FIG. 8 is a simplified block diagram of one or more components of a system environment in which services may be offered as a cloud.

In some examples, a cloud environment may provide one or more services. FIG. 8 is a simplified block diagram of one or more components of a system environment 800 in which services may be offered as a cloud. In the example illustrated in in FIG. 8, the system environment 800 includes one or more client computing devices 804, 806, 808 that may be used by users to interact with a cloud infrastructure system 802 that provides cloud services. The cloud infrastructure system 802 may comprise one or more computers and/or servers that may include those described above for the server 712 of FIG. 7.

It should be appreciated that the cloud infrastructure system 802 depicted in FIG. 8 may have other components than those depicted. Further, the example shown in FIG. 8 is only one example of a cloud infrastructure system that may incorporate the various examples discussed above. In some examples, the cloud infrastructure system 802 may have more or fewer components than shown in the figure, may combine two or more components, or may have a different configuration or arrangement of components.

The client computing devices 804, 806, 808 may be devices similar to those described above for the client computing devices 702, 704, 706, 708. The client computing devices 804, 806, 808 may be configured to operate a client application such as a web browser, a proprietary client application (e.g., Oracle Forms), or some other application, which may be used by a user of the client computing device to interact with the cloud infrastructure system 802 to use services provided by the cloud infrastructure system 802. Although the example system environment 800 is shown with three client computing devices, any number of client computing devices may be supported. Other devices such as devices with sensors, etc. may interact with the cloud infrastructure system 802.

Network(s) 810 may facilitate communications and exchange of data between the client computing devices 804, 806, 808 and the cloud infrastructure system 802. Each network may be any type of network familiar to those skilled in the art that can support data communications using any of a variety of commercially-available protocols, including those described above for the network(s) 710 of FIG. 7.

In some examples, services provided by the cloud infrastructure system 802 of FIG. 8 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In some examples, a specific instantiation of a service provided by the cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In some examples, the cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

The cloud infrastructure system 802 may also provide "big data" and related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various examples, the cloud infrastructure system 802 may be adapted to automatically provision, manage and track a customer's subscription to services offered by the cloud infrastructure system 802. The cloud infrastructure system 802 may provide the cloud services via different deployment models. For example, services may be provided under a public cloud model in which the cloud infrastructure system 802 is owned by an organization selling cloud services (e.g., owned by Oracle Corporation) and the services are made available to the general public or different industry enterprises. As another example, services may be provided under a private cloud model in which the cloud infrastructure system 802 is operated solely for a single organization and may provide services for one or more entities within the organization. The cloud services may also be provided under a community cloud model in which the cloud infrastructure system 802 and the services provided by the cloud infrastructure system 802 are shared by several organizations in a related community. The cloud services may also be provided under a hybrid cloud model, which is a combination of two or more different models.

In some examples, the services provided by the cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by the cloud infrastructure system 802. The cloud infrastructure system 802 then performs processing to provide the services in the customer's subscription order.

In some examples, the services provided by the cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can use applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some examples, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some examples, platform services provided by the cloud infrastructure system may include database cloud services, middleware cloud services (e.g., Oracle Fusion Middleware services), and Java cloud services. In one example, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In some examples, the cloud infrastructure system 802 may also include infrastructure resources 830 for providing the resources used to provide various services to customers of the cloud infrastructure system. In one example, the infrastructure resources 830 may include pre-integrated and optimized combinations of hardware, such as servers, storage, and networking resources to execute the services provided by the PaaS platform and the SaaS platform, and other resources.

In some examples, resources in the cloud infrastructure system 802 may be shared by multiple users and dynamically re-allocated per demand. Additionally, resources may be allocated to users in different time zones. For example, the cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In some examples, a number of internal shared services 832 may be provided that are shared by different components or modules of the cloud infrastructure system 802 to enable provision of services by the cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In some examples, the cloud infrastructure system 802 may provide comprehensive management of cloud services (e.g., SaaS, PaaS, and IaaS services) in the cloud infrastructure system. In one example, cloud management functionality may include capabilities for provisioning, managing and tracking a customer's subscription received by the cloud infrastructure system 802, and the like.

In one example, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an example operation, at step 834, a customer using a client device, such as the client computing devices 804, 806, 808, may interact with the cloud infrastructure system 802 by requesting one or more services provided by the cloud infrastructure system 802 and placing an order for a subscription for one or more services offered by the cloud infrastructure system 802. In some examples, the customer may access a cloud User Interface (UI) such as a first cloud UI 812, a second cloud UI 814, and/or a third cloud UI 816 and place a subscription order via these UIs. The order information received by the cloud infrastructure system 802 in response to the customer placing an order may include information identifying the customer and one or more services offered by the cloud infrastructure system 802 that the customer intends to subscribe to.

At step 836, the order information received from the customer may be stored in an order database 818. If this is a new order, a new record may be created for the order. In one example, the order database 818 can be one of several databases operated by the cloud infrastructure system 802 and operated in conjunction with other system elements.

At step 838, the order information may be forwarded to an order management module 820 that may be configured to perform billing and accounting functions related to the order, such as verifying the order, and upon verification, booking the order.

At step 840, information regarding the order may be communicated to an order orchestration module 822 that is configured to orchestrate the provisioning of services and resources for the order placed by the customer. In some instances, the order orchestration module 822 may use the services of the order provisioning module 824 for the provisioning. In some examples, the order orchestration module 822 enables the management of business processes associated with each order and applies business logic to determine whether an order should proceed to provisioning.

As shown in the example depicted in FIG. 8, at step 842, upon receiving an order for a new subscription, the order orchestration module 822 sends a request to the order provisioning module 824 to allocate resources and configure resources needed to fulfill the subscription order. The order provisioning module 824 enables the allocation of resources for the services ordered by the customer. The order provisioning module 824 provides a level of abstraction between the cloud services provided by the cloud infrastructure system 802 and the physical implementation layer that is used to provision the resources for providing the requested services. This enables the order orchestration module 822 to be isolated from implementation details, such as whether or not services and resources are actually provisioned on the fly or pre-provisioned and only allocated/assigned upon request.

At step 844, once the services and resources are provisioned, a notification may be sent to the subscribing customers indicating that the requested service is now ready for use. In some instance, information (e.g. a link) may be sent to the customer that enables the customer to start using the requested services.

At step 846, a customer's subscription order may be managed and tracked by an order management and monitoring module 826. In some instances, the order management and monitoring module 826 may be configured to collect usage statistics regarding a customer use of subscribed services. For example, statistics may be collected for the amount of storage used, the amount data transferred, the number of users, and the amount of system up time and system down time, and the like.

In some examples, the cloud infrastructure system 802 may include an identity management module 828 that is configured to provide identity services, such as access management and authorization services in the cloud infrastructure system 802. In some examples, the identity management module 828 may control information about customers who wish to use the services provided by the cloud infrastructure system 802. Such information can include information that authenticates the identities of such customers and information that describes which actions those customers are authorized to perform relative to various system resources (e.g., files, directories, applications, communication ports, memory segments, etc.). The identity management module 828 may also include the management of descriptive information about each customer and about how and by whom that descriptive information can be accessed and modified.

Figure 9:
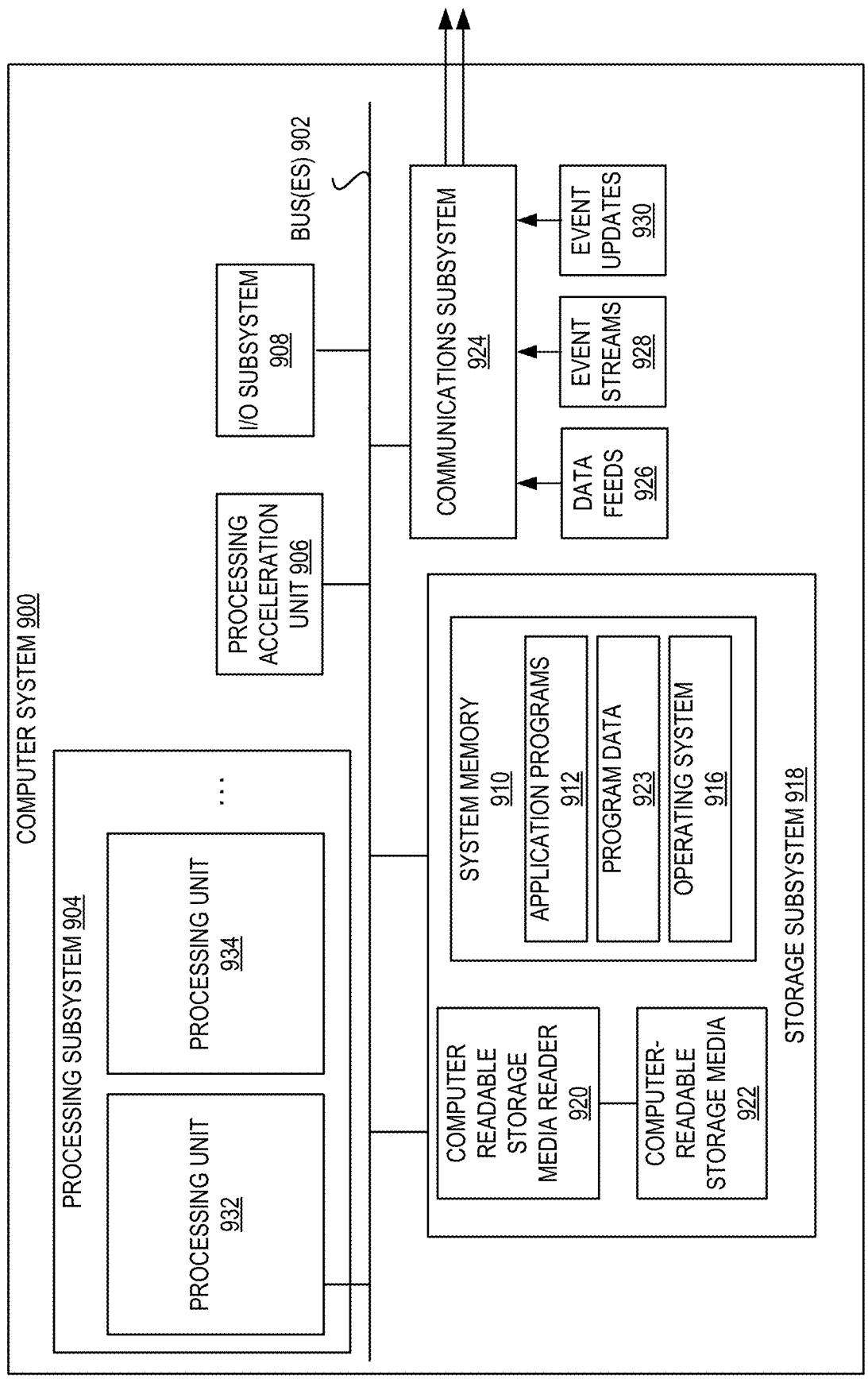
FIG. 9 illustrates an example of a computer system that may be used to implement various examples.

FIG. 9 illustrates an example of a computer system 900 that may be used to implement the various examples discussed above. In some examples, the computer system 900 may be used to implement any of the various servers and computer systems described above. As shown in FIG. 9, the computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. The storage subsystem 918 may include tangible computer-readable storage media 922 and a system memory 910.

The bus subsystem 902 provides a mechanism for letting the various components and subsystems of the computer system 900 communicate with each other as intended. Although the bus subsystem 902 is shown schematically as a single bus, alternate examples of the bus subsystem may utilize multiple buses. The bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 904 controls the operation of the computer system 900 and may comprise one or more processing units 932, 934. A processing unit may include one or more processors, including single core or multicore processors, one or more cores of processors, or combinations thereof In some examples, the processing subsystem 904 can include one or more special purpose co-processors such as graphics processors, digital signal processors (DSPs), or the like. In some examples, some or all of the processing units of the processing subsystem 904 can be implemented using customized circuits, such as application specific integrated circuits (ASICs), or field programmable gate arrays (FPGAs).

In some examples, the processing units in the processing subsystem 904 can execute instructions stored in the system memory 910 or on the computer-readable storage media 922. In various examples, the processing units can execute a variety of programs or code instructions and can maintain multiple concurrently executing programs or processes. At any given time, some or all of the program code to be executed can be resident in the system memory 910 and/or on the computer-readable storage media 922 including potentially on one or more storage devices. Through suitable programming, the processing subsystem 904 can provide various functionalities.

In some examples, a processing acceleration unit 906 may be provided for performing customized processing or for off-loading some of the processing performed by the processing subsystem 904 so as to accelerate the overall processing performed by the computer system 900.

The I/O subsystem 908 may include devices and mechanisms for inputting information to the computer system 900 and/or for outputting information from or via the computer system 900. In general, use of the term "input device" is intended to include all possible types of devices and mechanisms for inputting information to the computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 918 provides a repository or data store for storing information that is used by the computer system 900. The storage subsystem 918 provides a tangible non-transitory computer-readable storage medium for storing the basic programming and data constructs that provide the functionality of some examples. Software (programs, code modules, instructions) that when executed by the processing subsystem 904 provide the functionality described above may be stored in the storage subsystem 918. The software may be executed by one or more processing units of the processing subsystem 904. The storage subsystem 918 may also provide a repository for storing data used in accordance with the present disclosure.

The storage subsystem 918 may include one or more non-transitory memory devices, including volatile and non-volatile memory devices. As shown in FIG. 9, the storage subsystem 918 includes a system memory 910 and a computer-readable storage media 922. The system memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 900, such as during start-up, may typically be stored in the ROM. The RAM typically contains data and/or program modules that are presently being operated and executed by the processing subsystem 904. In some implementations, the system memory 910 may include multiple different types of memory, such as static random access memory (SRAM) or dynamic random access memory (DRAM).

By way of example, and not limitation, as depicted in FIG. 9, the system memory 910 may store application programs 912, which may include client applications, Web browsers, mid-tier applications, relational database management systems (RDBMS), etc., program data 923, and an operating system 916. By way of example, the operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 922 may store programming and data constructs that provide the functionality of some examples. Software (programs, code modules, instructions) that when executed by the processing subsystem 904, a processor provides the functionality described above that may be stored in the storage subsystem 918. By way of example, the computer-readable storage media 922 may include non-volatile memory such as a hard disk drive, a magnetic disk drive, an optical disk drive such as a CD ROM, DVD, a Blu-Ray® disk, or other optical media. The computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 922 may provide storage of computer-readable instructions, data structures, program modules, and other data for the computer system 900.

In some examples, the storage subsystem 918 may also include a computer-readable storage media reader 920 that can further be connected to the computer-readable storage media 922. Together and, optionally, in combination with the system memory 910, the computer-readable storage media 922 may comprehensively represent remote, local, fixed, and/or removable storage devices plus storage media for storing computer-readable information.

In some examples, the computer system 900 may provide support for executing one or more virtual machines. The computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by the computer system 900. Accordingly, multiple operating systems may potentially be run concurrently by the computer system 900. Each virtual machine generally runs independently of the other virtual machines.

The communications subsystem 924 provides an interface to other computer systems and networks. The communications subsystem 924 serves as an interface for receiving data from and transmitting data to other systems from the computer system 900. For example, the communications subsystem 924 may enable the computer system 900 to establish a communication channel to one or more client computing devices via the Internet for receiving and sending information from and to the client computing devices.

The communication subsystem 924 may support both wired and/or wireless communication protocols. For example, in some examples, the communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 924 can provide wired network connectivity (e.g., Ethernet) in addition to or instead of a wireless interface.

The communication subsystem 924 can receive and transmit data in various forms. For example, in some examples, the communications subsystem 924 may receive input communication in the form of structured and/or unstructured data feeds 926, event streams 928, event updates 930, and the like. For example, the communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

The communications subsystem 924 may also be configured to output the structured and/or unstructured data feeds 926, event streams 928, event updates 930, and the like to one or more databases that may be in communication with one or more streaming data source computers coupled to the computer system 900.

The computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various examples.

Although specific implementations have been described, various modifications, alterations, alternative constructions, and equivalents are also encompassed within the scope of the present disclosure. The modifications include any relevant combination of the disclosed features. Implementations described in the present disclosure are not restricted to operation within certain specific data processing environments, but are free to operate within a plurality of data processing environments. Additionally, although implementations described in the present disclosure have been described using a particular series of transactions and steps, it should be apparent to those skilled in the art that the scope of the present disclosure is not limited to the described series of transactions and steps. Various features and aspects of the above-described implementations may be used individually or jointly.

Further, while implementations described in the present disclosure have been described using a particular combination of hardware and software, it should be recognized that other combinations of hardware and software are also within the scope of the present disclosure. Implementations described in the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific implementations have been described, these are not intended to be limiting. Various modifications and equivalents are within the scope of the following claims.

What is claimed is:

1. A computer-implemented method comprising, at a computer system of a security management system:

obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service;

identifying, in the activity data, one or more actions that are privileged with respect to the cloud service;

identifying, using the activity data, a set of users who performed the one or more actions, wherein the set of users is determined from the one or more users associated with the tenant;

categorizing the set of users as privileged;

determining, using the activity data, one or more risk scores for the one or more users;

determining that a risk score for user in the set of users is greater than a threshold;

determining a security control for the service provider system, wherein the security control is used by the service provider system to configure access to the cloud service;

determining one or more instructions to send to the service provider system; and sending the one or more instructions to the service provider system, wherein the one or more instructions cause the security control to be changed with respect to the user, wherein access to the cloud service by the user is modified due to the change to the security control.

2. The computer-implemented method of claim 1, wherein the one or more actions are identified using a list of actions associated with the cloud service, wherein actions in the list of actions are categorized as privileged with respect to the cloud service.

3. The computer-implemented method of claim 1, wherein the one or more actions is identified using a list of administrative actions.

4. The computer-implemented method of claim 1, further comprising:

using the one or more actions and past activity data to generate a model, the model describing a pattern of usage of the cloud service that is privileged with respect to the cloud service; and using the model to identify the set of users.

5. The computer-implemented method of claim 1, further comprising:

grouping the actions performed during used of the cloud service; and identifying a group of actions that includes an action that is privileged, wherein the set of users is identified using the group of actions.

6. The computer-implemented method of claim 1, wherein risk scores indicate a degree of security risk to the tenant from actions performed by a user in using the cloud service.

7. The computer-implemented method of claim 1, wherein risk scores are computed as a weight sum of risk indicators.

8. The computer-implemented method of claim 1, wherein risk scores for users categorized as privileged are computed with greater weights than are risk scores for non-privileged users.

9. The computer-implemented method of claim 1, wherein a privileged action is an action that, when executed by a first user, can modify the cloud service in a manner that affects use of the cloud service by other users.

10. The computer-implemented method of claim 1, wherein a privileged action is an action that, when executed by a first user, can affect user accounts of other users of the cloud service.

11. A computing system of a security management system, comprising:
one or more processors; and
a memory coupled to and readable by the one or more processors, the memory including instructions that, when executed by the one or more processors, cause the one or more processors to perform operations including:
obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service;
identifying, in the activity data, one or more actions that are privileged with respect to the cloud service;
identifying, using the activity data, a set of users who performed the one or more actions, wherein the set of users is determined from the one or more users associated with the tenant;
categorizing the set of users as privileged;
determining, using the activity data, one or more risk scores for the one or more users;
determining that a risk score for user in the set of users is greater than a threshold;
determining a security control for the service provider system, wherein the security control is used by the service provider system to configure access to the cloud service;
determining one or more instructions to send to the service provider system; and
sending the one or more instructions to the service provider system, wherein the one or more instructions cause the security control to be changed with respect to the user, wherein access to the cloud service by the user is modified due to the change to the security control.

12. The computing system of claim 11, wherein the one or more actions are identified using a list of actions associated with the cloud service, wherein the list of actions is categorized as privileged with respect to the cloud service.

13. The computing system of claim 11, wherein the one or more actions is identified using a list of administrative actions.

14. The computing system of claim 11, the memory further including instructions that, when executed by the one or more processors, cause the one or more processors to perform operations including:
using the one or more actions and past activity data to generate a model, the model describing a pattern of usage of the cloud service that is privileged with respect to the cloud service; and
using the model to identify the set of users.

15. The computing system of claim 11, the memory further including instructions that, when executed by the one or more processors, cause the one or more processors to perform operations including:
grouping the actions performed during used of the cloud service; and
identifying a group of actions that includes an action that is privileged, wherein the set of users is identified using the group of actions.

16. A non-transitory computer-readable medium having stored thereon instructions that, when executed by one or more processors of a computing system of a security management system, cause the one or more processors to:
obtain activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service;
identify, in the activity data, one or more actions that are privileged with respect to the cloud service;
identify, using the activity data, a set of users who performed the one or more actions, wherein the set of users is determined from the one or more users associated with the tenant;
categorize the set of users as privileged;
determine, using the activity data, one or more risk scores for the one or more users;
determine that a risk score for user in the set of users is greater than a threshold;
determine a security control for the service provider system, wherein the security control is used by the service provider system to configure access to the cloud service;
determine one or more instructions to send to the service provider system; and
send the one or more instructions to the service provider system, wherein the one or more instructions cause the security control to be changed with respect to the user, wherein access to the cloud service by the user is modified due to the change to the security control.

17. The non-transitory computer-readable medium of claim 16, wherein the one or more actions are identified using a list of actions associated with the cloud service, wherein the list of actions is categorized as privileged with respect to the cloud service.

18. The non-transitory computer-readable medium of claim 16, wherein the one or more actions is identified using a list of administrative actions.

19. The non-transitory computer-readable medium of claim 16, further including instructions that, when executed by the one or more processors, cause the one or more processors to:
use the one or more actions and past activity data to generate a model, the model describing a pattern of usage of the cloud service that is privileged with respect to the cloud service; and
use the model to identify the set of users.

20. The non-transitory computer-readable medium of claim 16, the memory further including instructions that, when executed by the one or more processors, cause the one or more processors to:
group the actions performed during used of the cloud service; and
identify a group of actions that includes an action that is privileged, wherein the set of users is identified using the group of actions.

* * * * *

UNITED STATES PATENT AND TRADEMARK OFFICE
CERTIFICATE OF CORRECTION

PATENT NO. : 10,701,094 B2
APPLICATION NO. : 16/011538
DATED : June 30, 2020
INVENTOR(S) : Kirti et al.

Page 1 of 2

It is certified that error appears in the above-identified patent and that said Letters Patent is hereby corrected as shown below:

On the Title Page

Page 2, Column 1, item [56], Line 18, delete "abise/cj—" and insert -- abuse/cj— --, therefor.

Page 2, Column 2, item [56], Line 38, delete "www.kickstartercom/" and insert -- www.kickstarter.com/ --, therefor.

In the Drawings

Sheet 1 of 9, in FIG. 1, under Reference Numeral 182, Line 2, delete "Accesser" and insert -- Accessor --, therefor.

In the Specification

Column 3, Line 16, delete "used of" and insert -- use of --, therefor.

Column 5, Line 59, delete "Lgrhythem," and insert -- Logrhythm, --, therefor.

Column 9, Line 1, delete "the a" and insert -- the --, therefor.

Column 11, Line 10, delete "a group users" and insert -- a group of users --, therefor.

Column 11, Line 32, delete "Transport" and insert -- Transfer --, therefor.

Column 12, Line 3, delete "computer readable" and insert -- computer-readable --, therefor.

Column 12, Line 15, delete "accesser" and insert -- accessor --, therefor.

Column 13, Line 7, delete "uer" and insert -- user --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,701,094 B2

Column 18, Line 50, delete "accesser" and insert -- accessor --, therefor.

Column 18, Line 59, delete "accesser" and insert -- accessor --, therefor.

Column 18, Line 62, delete "thereof" and insert -- thereof. --, therefor.

Column 21, Line 4, delete "examples ," and insert -- examples, --, therefor.

Column 23, Line 33, delete "services" and insert -- services. --, therefor.

Column 30, Line 62, delete "("stdlogcntday 1wk")," and insert -- ("stdlogcntday1wk"), --, therefor.

Column 36, Line 29, delete "ounts" and insert -- counts --, therefor.

Column 36, Line 33, delete "ounts" and insert -- counts --, therefor.

Column 36, Line 37, delete "ounts" and insert -- counts --, therefor.

Column 37, Line 34, delete "adminsitrators" and insert -- administrators --, therefor.

Column 37, Line 37, delete "autoamated" and insert -- automated --, therefor.

Column 45, Lines 22-23, delete "computer readable-medium," and insert -- computer-readable medium, --, therefor.

Column 46, Line 32, delete "recognized" and insert -- recognize --, therefor.

Column 46, Line 42, delete "used of" and insert -- use of --, therefor.

Column 50, Line 21, delete "in in" and insert -- in --, therefor.

Column 55, Line 43, delete "thereof" and insert -- thereof. --, therefor.

In the Claims

Column 61, Line 64, Claim 15 delete "used of" and insert -- use of --, therefor.

Column 62, Line 60, Claim 20 delete "used of" and insert -- use of --, therefor.